(12) United States Patent
Zhang et al.

(10) Patent No.: US 9,703,288 B1
(45) Date of Patent: Jul. 11, 2017

(54) SYSTEM AND METHOD FOR AERIAL SYSTEM CONTROL

(71) Applicant: Hangzhou Zero Zero Technology Co., Ltd., Hangzhou, Zhejiang Prov. (CN)

(72) Inventors: Tong Zhang, Hangzhou (CN); Mengqiu Wang, Hangzhou (CN); Jia Lu, Hangzhou (CN); Pengxiang Jin, Hangzhou (CN); Lixin Liu, Hangzhou (CN)

(73) Assignee: Zero Zero Robotics Inc., Wilmington, DE (US)

( * ) Notice: Subject to any disclaimer, the term of this patent is extended or adjusted under 35 U.S.C. 154(b) by 0 days.

(21) Appl. No.: 15/349,834

(22) Filed: Nov. 11, 2016

Related U.S. Application Data

(60) Provisional application No. 62/326,791, filed on Apr. 24, 2016.

(51) Int. Cl.
| | | |
|---|---|---|
| *G05D 1/00* | (2006.01) | |
| *H01Q 1/48* | (2006.01) | |
| *H01Q 1/22* | (2006.01) | |
| *H04N 5/77* | (2006.01) | |
| *H04N 7/18* | (2006.01) | |
| *H04N 5/232* | (2006.01) | |
| *H04N 5/225* | (2006.01) | |
| *B64C 39/02* | (2006.01) | |
| *B64D 47/08* | (2006.01) | |
| *G06F 3/0488* | (2013.01) | |

(52) U.S. Cl.
CPC ......... *G05D 1/0038* (2013.01); *B64C 39/024* (2013.01); *B64D 47/08* (2013.01); *G05D 1/0016* (2013.01); *G05D 1/0094* (2013.01); *H01Q 1/2291* (2013.01); *H01Q 1/48* (2013.01); *H04N 5/2253* (2013.01); *H04N 5/23216* (2013.01); *H04N 5/23293* (2013.01); *H04N 5/77* (2013.01); *H04N 7/183* (2013.01); *G06F 3/04883* (2013.01)

(58) Field of Classification Search
CPC . G11B 27/031; G06K 9/0064; H04N 5/23222
See application file for complete search history.

(56) References Cited

U.S. PATENT DOCUMENTS

| | | |
|---|---|---|
| 7,341,223 B2 | 3/2008 | Chu |
| 8,903,568 B1 | 12/2014 | Wang et al. |
| 9,085,355 B2 | 7/2015 | DeLorean |
| 9,266,609 B1 | 2/2016 | Kunz |

(Continued)

FOREIGN PATENT DOCUMENTS

| | | |
|---|---|---|
| CN | 104486543 | 4/2015 |
| CN | 105425952 | 3/2016 |
| WO | 2016080598 A1 | 5/2016 |

*Primary Examiner* — Thomas Tarcza
*Assistant Examiner* — Alex C Dunn
(74) *Attorney, Agent, or Firm* — Jeffrey Schox; Diana Lin

(57) ABSTRACT

A method for controlling an aerial system, including: receiving a video, selecting a region of the video, controlling a touch-sensitive display to display the region of the video, receiving a drag input from the touch-sensitive display, receiving a second video, selecting a second region of the second video based on the drag input, controlling the touch-sensitive display to display the second region of the second video, and moving the aerial system based on the drag input.

19 Claims, 14 Drawing Sheets

(56) References Cited

U.S. PATENT DOCUMENTS

| | | |
|---|---|---|
| 9,321,531 B1 | 4/2016 | Takayama et al. |
| 9,346,543 B2 * | 5/2016 | Kugelmass ............ G05D 1/101 |
| 9,429,141 B2 | 8/2016 | Lind et al. |
| 9,493,235 B2 | 11/2016 | Zhou et al. |
| 9,527,597 B1 | 12/2016 | Sada et al. |
| 2005/0004723 A1 | 1/2005 | Duggan et al. |
| 2011/0221692 A1 | 9/2011 | Seydoux |
| 2012/0097801 A1 | 4/2012 | Barrett |
| 2012/0200703 A1 | 8/2012 | Nadir et al. |
| 2014/0158816 A1 | 6/2014 | DeLorean |
| 2015/0120336 A1 | 4/2015 | Grokop et al. |
| 2015/0179219 A1 * | 6/2015 | Gao ................... G06K 9/00664 |
| | | 386/278 |
| 2015/0183512 A1 | 7/2015 | Jensen et al. |
| 2016/0080598 A1 | 3/2016 | Chen et al. |
| 2016/0101856 A1 | 4/2016 | Kohstall |
| 2016/0122038 A1 * | 5/2016 | Fleischman ............... B64F 1/20 |
| | | 701/2 |
| 2016/0191793 A1 * | 6/2016 | Yang .................. H04N 5/23222 |
| | | 348/207.11 |
| 2016/0221671 A1 | 8/2016 | Fisher et al. |
| 2016/0221683 A1 | 8/2016 | Roberts et al. |
| 2017/0011333 A1 | 1/2017 | Greiner et al. |

* cited by examiner

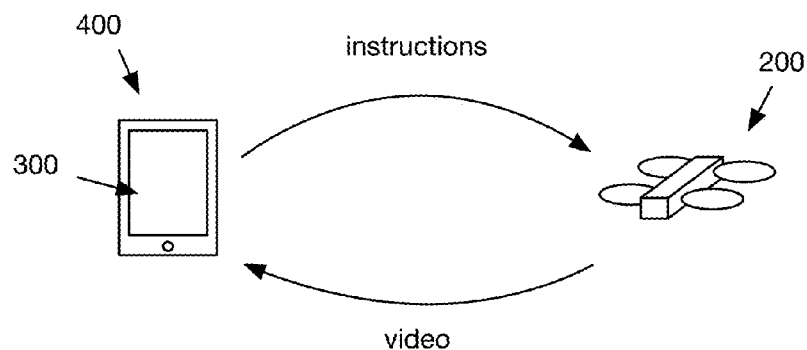
FIGURE 1
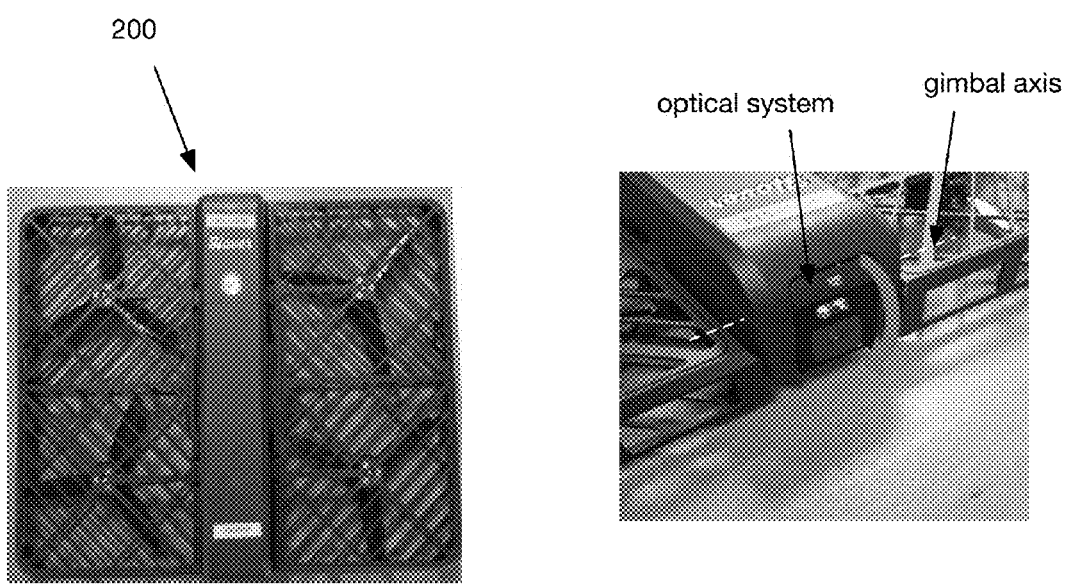
FIGURE 2
FIGURE 3

SYSTEM AND METHOD FOR AERIAL SYSTEM CONTROL

CROSS-REFERENCE TO RELATED APPLICATIONS

This application claims the benefit of U.S. Provisional Application No. 62/326,791, filed 24 Apr. 2016, which is incorporated in its entirety by this reference.

This application is related to U.S. application Ser. No. 15/349,749 filed 11 Nov. 2016 and titled "System And Method For Automated Aerial System Operation," which claims priority to U.S. Provisional Application No. 62/353,337, filed 22 Jun. 2016, and U.S. Provisional Application No. 62/326,600, filed 22 Apr. 2016, all of which are incorporated in their entireties by this reference.

TECHNICAL FIELD

This invention relates generally to the aerial system field, and more specifically to a new and useful system and method for remote drone control in the aerial systems field.

BRIEF DESCRIPTION OF THE FIGURES

FIG. 1 is a schematic representation of the system.
FIG. 2 is a specific example of the aerial system.
FIG. 3 is a specific example of the optical system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

As shown in FIG. 1, a system for aerial system control includes a control client, configured to execute on a remote device, and an aerial system. The system functions to remotely control the aerial system using the remote device in an intuitive manner.

Figure 5:
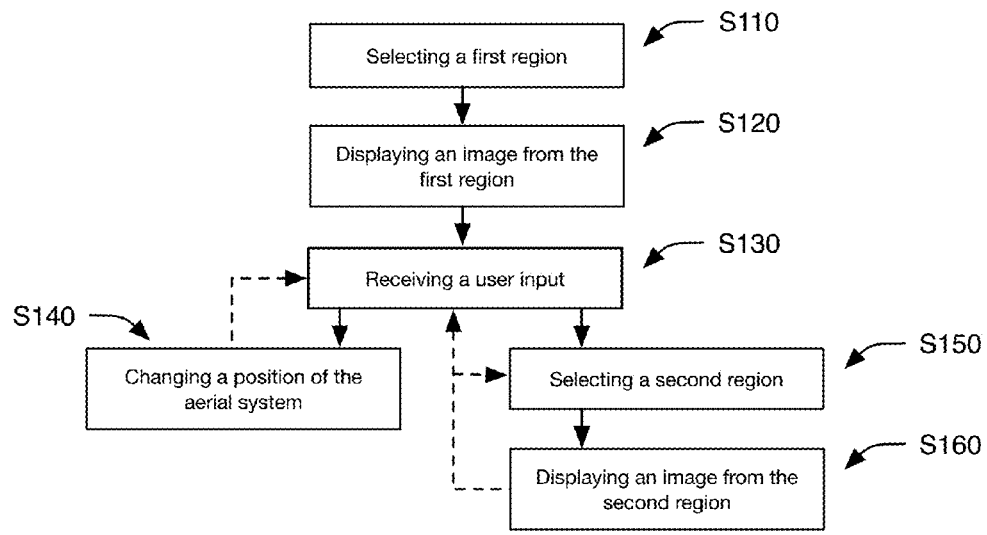
FIG. 5 is as flowchart diagram of the method.

As shown in FIG. 5, a method for aerial system control includes: selecting a first region of an imaging element S110, displaying an image from the first region S120, receiving a user input S130, changing a position of the aerial system S140, selecting a second region of a second imaging element S150, and displaying an image from the second region S160.

Figure 6:
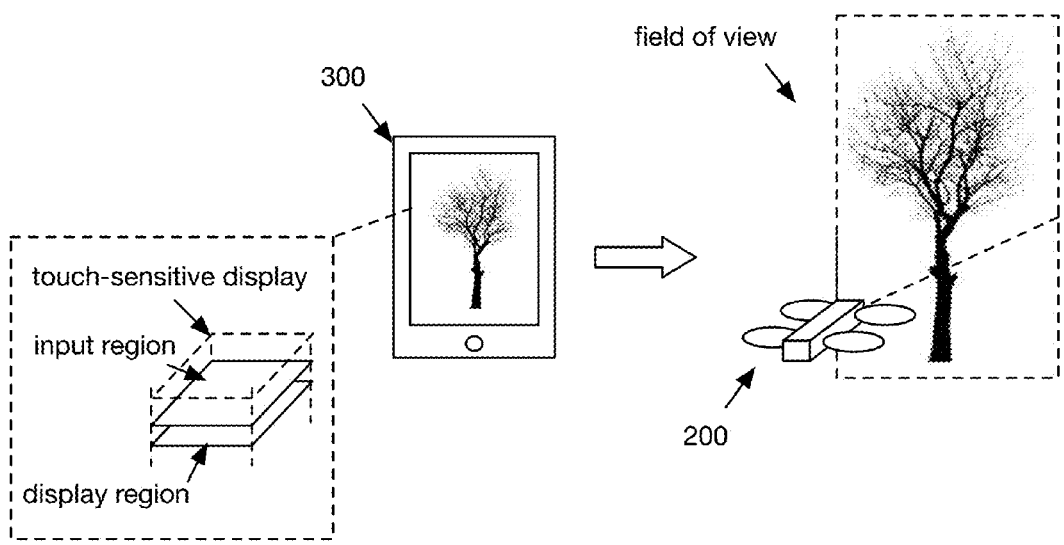
FIG. 6 is a specific example of the control client displaying video recorded by the aerial system.

In operation, as shown in FIG. 6, the aerial system functions to capture and stream video to the remote device in near-real time during aerial system flight. The control client on the remote device functions to receive the video, display the video on a device output, receive commands indicative of aerial system operation instructions from a device input, and send the operation instructions to the aerial system in near-real time. In one variation, the operation instructions can be received at a device input overlaid over the video, such that a user controls the aerial system by moving the video's field of view (FOV). The aerial system can receive the operation instructions and automatically operate based on the operation instructions. In the variation above, the aerial system can be automatically operated such that the resultant optical sensor's FOV moves in the manner prescribed by the user at the remote device.

In a specific example, users can directly interact with the video or image on the client (e.g., swipe, zoom, etc.), wherein the user interactions are automatically translated into aerial system movements that physically achieve the desired effect (e.g., translating horizontally to move the frame along the swipe vector, moving toward or away from an object to zoom in or out, respectively, etc.). In this specific example, the system and method can create a WYSIWYG (what you see is what you get)-type interaction.

2. Benefits

The system and method for remote aerial system control can confer several benefits over conventional systems.

First, in some variants, the aerial system operation instructions are received on the video displayed by the control client. This allows a user to control the drone through the visual output (e.g., by controlling what the camera is aimed at), similar to a "what you see is what you get" experience. The inventors have discovered that this interaction can be more intuitive than conventional control paradigms (e.g., having one or more joysticks that control different aspects of aerial system operation), due to the direct link between the user input (on the video) and the video's response (e.g., created through digital editing and/or aerial system movement). By allowing a user to control the aerial system (e.g., drone) in this indirect manner, the system can simplify remote aerial system control over conventional systems.

Second, in some variants, preferably variants in which the aerial system operation instructions are received on the video displayed by the control client, but additionally or alternatively variants in which the operation instructions are otherwise received, the control client can display only a cropped portion of the video on the device output, and the cropping region can be altered based on the operation instructions and/or the aerial system status. This can allow for stabilization and/or responsiveness of the visual output (e.g., using automatic video stabilization programs or methods, etc.). For example, the cropping region can be moved to simulate aerial system motion while waiting for the aerial system to accelerate, and can be rotated to correct for aerial system roll. The inventors have discovered that these modifications of the visual output can provide a more intuitive and less frustrating user experience, due to the ease of watching the visual output and the apparent fast response of the aerial system to operation instructions provided by the user.

Third, in some variants, the system can minimize aerial system mass and/or volume by substituting optical sensor actuation with aerial system movement. For example, instead of using a three-axis gimbal system as the optical sensor actuation mechanism, the system can include a single-axis gimbal system, wherein optical sensor actuation about the remaining two axes can be accomplished by moving the aerial system. In a specific example, the optical system can rotate about a single rotational axis (e.g., the x-axis), such that the optical system is only capable of pitching relative to the aerial system; the aerial system replaces optical system yaw or roll (e.g., about the z-axis or y-axis, respectively) by rotating about an aerial system axis. The aerial system can additionally or alternatively function in place of or supplement the optical system's zoom lens (e.g., by flying closer to or retreating away from the video subject, possibly in coordination with actuation of the optical zoom). By substituting the optical sensor component functionalities with aerial system actions (e.g., zoom, rotation, etc.), the system enables the substituted components to be removed from the system, which can reduce overall system mass and/or volume.

However, the system and method can be otherwise configured, and confer any other suitable set of benefits.

3. System

The control client 300 of the system functions to receive data from the aerial system 200, control data display on a remote device 400, receive operation instructions in association with the displayed data, and facilitate aerial system remote control based on the operation instructions. The control client 300 is preferably configured to execute on a remote device 400, but can alternatively be configured to execute on the aerial system 200 or on any other suitable system. The control client 300 can be a native application (e.g., a mobile application), a browser application, an operating system application, or be any other suitable construct.

The control client 300 can define a display frame (e.g., digital structure specifying the region of the remote device output to display the video streamed from the aerial system 200), an input frame (e.g., digital structure specifying the region of the remote device input at which inputs are received), or any other suitable user interface structure. The display frame and input frame preferably overlap, more preferably overlapping entirely (e.g., substantially identical regions), but can alternatively be separate and distinct, adjacent, contiguous, have different sizes, or be otherwise related. The control client 300 can additionally include an operation instruction module that functions to convert inputs, received at the input frame, into aerial system operation instructions. The operation instruction module can be a static module that maps a predetermined set of inputs to a predetermined set of operation instructions; a dynamic module that dynamically identifies and maps inputs to operation instructions; or be any other suitable module. The operation instruction module can calculate the operation instructions based on the inputs, select the operation instructions based on the inputs, or otherwise determine the operation instructions. However, the control client 300 can include any other suitable set of components and/or submodules.

The remote device 400 executing the control client 300 functions to display the data (e.g., as instructed by the control client 300), receive user inputs, compute the operation instructions based on the user inputs (e.g., as instructed by the control client 300), send operation instructions to the aerial system 200, store control client information (e.g., associated aerial system identifiers, security keys, user account information, user account preferences, etc.), or perform any other suitable functionality. The remote device 400 can be a user device (e.g., smartphone, tablet, laptop, etc.), a networked server system, or be any other suitable remote computing system. The remote device 400 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., WiFi, cellular, WLAN, WiMAX, microwave, IR, radio frequency, etc.), short-range systems (e.g., BLE, BLE long range, NFC, Zigbee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 400 can include a display (e.g., a touch-sensitive display including a touchscreen overlaying the display), a set of radios (e.g., WiFi, cellular, BLE, etc.), and a set of orientation sensors. However, the remote device 400 can include any suitable set of components.

The aerial system 200 functions to fly within a physical space, capture video, stream the video in near-real time to the remote device 400, and operate based on operation instructions received from the remote device 400. The aerial system 200 can additionally process the video (e.g., video frames) prior to streaming the video to the remote device 400; generate and automatically operate based on its own operation instructions (e.g., to automatically follow a subject); or perform any other suitable functionality. The aerial system 200 can additionally function to move the optical sensor's field of view within the physical space. For example, the aerial system 200 can control macromovements (e.g., large FOV changes, on the order of meter adjustments), micromovements (e.g., small FOV changes, on the order of millimeter or centimeter adjustments), or any other suitable movement.

Figure 4:
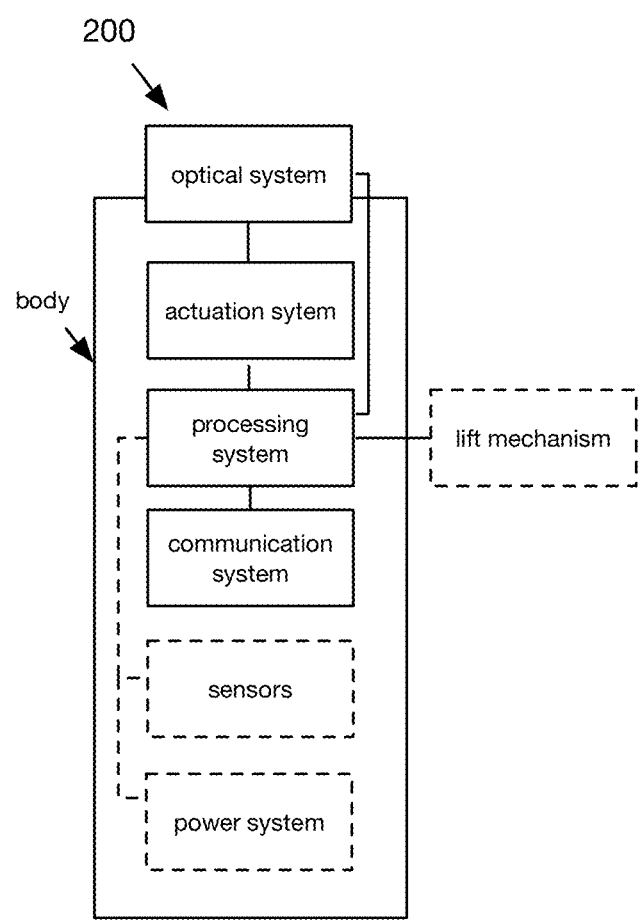
FIG. 4 is a schematic representation of the aerial system.

As shown in FIG. 4, the aerial system 200 (e.g., drone) can include a body, a processing system, a communication system, an optical system, and an actuation mechanism mounting the optical system to the body. The aerial system 200 can additionally or alternatively include lift mechanisms, sensors, power system, or any other suitable component.

The body of the aerial system functions to mechanically protect and/or retain the aerial system components. The body can define a lumen, be a platform, or have any suitable configuration. The body can be enclosed, open (e.g., a truss), or have any suitable construction. The body can be made of metal, plastic (e.g., polymer), carbon composite, or any other suitable material. The body can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, the body's transverse axis can be substantially parallel a gravity vector (e.g., perpendicular a ground plane) and the body's longitudinal and lateral axes can be substantially perpendicular the gravity vector (e.g., parallel the ground plane). However, the body can be otherwise configured.

The processing system of the aerial system functions to control aerial system operation. The processing system can: receive operation instructions from the communication system, interpret the operation instructions into machine instructions, and control aerial system components based on the machine instructions (individually or as a set). The processing system can additionally or alternatively process the images recorded by the camera, stream images to the remote device 400 (e.g., in real- or near-real time), or perform any other suitable functionality. The processing system can include one or more: processors (e.g., CPU, GPU, etc.), memory (e.g., Flash, RAM, etc.), or any other suitable processing component. In one variation, the processing system can additionally include dedicated hardware that automatically processes the images (e.g., dewarps the image, filters the image, crops the image, etc.) prior to transmission to the remote device 400. The processing system is preferably connected to the active components of the aerial system and mounted to the body, but can alternatively be otherwise related to aerial system components.

The communication system of the aerial system functions to send and/or receive information from the remote device 400. The communication system is preferably connected to the processing system, such that the communication system sends and/or receives data form the processing system, but can alternatively be connected to any other suitable component. The aerial system 200 can include one or more communication systems of one or more types. The communication system can include wireless connections, such as radios supporting: long-range systems (e.g., WiFi, cellular, WLAN, WiMAX, microwave, IR, radio frequency, etc.), short-range systems (e.g., BLE, BLE long range, NFC, Zigbee, RF, audio, optical, etc.), or any other suitable communication system. The communication system preferably shares at least one system protocol (e.g., BLE, RF, etc.) with the remote device 400, but can alternatively communicate with the remote device 400 via an intermediary communication system (e.g., a protocol translation system). However, the communication system can be otherwise configured.

The optical system of the aerial system functions to record images of the physical space proximal the aerial system 200. The optical system is preferably mounted to the body via the actuation mechanism, but can alternatively be statically mounted to the body, removably mounted to the body, or otherwise mounted to the body. The optical system is preferably mounted to the front end of the body, but can optionally be mounted to the bottom (e.g., proximal the front), top, back end, or any other suitable portion of the body. The optical system is preferably connected to the processing system, but can alternatively be connected to the communication system or to any other suitable system. The optical system can additionally include dedicated image processing hardware that automatically processes images recorded by the camera prior to transmission to the processor or other endpoint. The aerial system 200 can include one or more optical systems of same or different type, mounted to the same or different position. In one variation, the aerial system 200 includes a first optical system, mounted to the front end of the body, and a second optical system, mounted to the bottom of the body. The first optical system can actuate about a pivotal support, and the second optical system can be substantially statically retained relative to the body, with the respective active surface substantially parallel the body bottom. The first optical sensor can be high-definition, while the second optical sensor can be low definition. However, the optical system can be otherwise configured.

The optical system can include one or more optical sensors. The optical sensor can include: a single lens camera (e.g., CCD camera, CMOS camera, etc.), a stereocamera, a hyperspectral camera, a multispectral camera, or any other suitable image sensor. However, the optical system can be any other suitable optical system. The optical system can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor, but can alternatively have any suitable shape. The image frame preferably defines aspects of the images sampled by the optical sensor (e.g., image dimensions, resolution, pixel size and/or shape, etc.). The optical sensor can optionally include a zoom lens, digital zoom, fisheye lens, filter, or any other suitable active or passive optical adjustment. Application of the optical adjustment can be actively controlled by the controller, manually controlled by the user (e.g., wherein the user manually sets the adjustment), controlled by the remote device 400, or otherwise controlled. In one variation, the optical system can include a housing enclosing the remainder of the optical system components, wherein the housing is mounted to the body. However, the optical system can be otherwise configured.

The actuation mechanism of the aerial system functions to actionably mount the optical system to the body. The actuation mechanism can additionally function to dampen optical sensor vibration (e.g., mechanically stabilize the resultant image), accommodate for aerial system roll, or perform any other suitable functionality. The actuation mechanism can be active (e.g., controlled by the processing system), passive (e.g., controlled by a set of weights, spring elements, magnetic elements, etc.), or otherwise controlled. The actuation mechanism can rotate the optical system about one or more axes relative to the body, translate the optical system along one or more axes relative to the body, or otherwise actuate the optical system. The optical sensor can be mounted to the support along a first end, along an optical sensor back (e.g., opposing the active surface), through the optical sensor body, or along any other suitable portion of the optical sensor.

In one variation, the actuation mechanism can include a motor connected to a single pivoted support (e.g., gimbal), wherein the motor pivots the support about the rotational axis based on instructions received from the controller. The support is preferably arranged with the rotational axis substantially parallel the lateral axis of the body, but can alternatively be arranged with the rotational axis at any other suitable orientation relative to the body. The support is preferably arranged within a recessed cavity defined by the body, wherein the cavity further encompasses the optical sensor but can alternatively be arranged along the body exterior or arranged at any other suitable portion of the body. The optical sensor is preferably mounted to the support with the active surface substantially parallel the rotational axis (e.g., with the lateral axis, or axis parallel the lateral axis of the body, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body (e.g., the body interior), electrically connected to and controlled by the processing system, and electrically connected to and powered by the power source. However, the motor can be otherwise connected. The actuation mechanism preferably includes a single motor-support set, but can alternatively include multiple motor-support sets, wherein auxiliary motor-support sets can be arranged orthogonal (or at any other suitable angle to) the first motor-support set.

In a second variation, the actuation mechanism can include a set of pivoted supports and weights connected to the optical sensor offset from the optical sensor center of gravity, wherein the actuation mechanism passively stabilizes the optical sensor.

The lift mechanism of the aerial system functions to enable aerial system flight. The lift mechanism preferably includes a set propeller blades driven by a motor, but can alternatively include any other suitable propulsion mechanism. The lift mechanism is preferably mounted to the body and controlled by the processing system, but can alternatively be otherwise mounted to the aerial system 200 and/or controlled. The aerial system 200 can include multiple lift mechanisms. In one example, the aerial system 200 includes four lift mechanisms (e.g., two pairs of lift mechanisms), wherein the lift mechanisms are substantially evenly distributed about the perimeter of the aerial system (e.g., wherein the lift mechanisms of each pair oppose each other across the body). However, the lift mechanisms can be otherwise configured.

The sensors of the aerial system function to record signals indicative of aerial system operation, the ambient environment surrounding the aerial system 200 (e.g., the physical space proximal the aerial system 200), or any other suitable parameter. The sensors are preferably mounted to the body and controlled by the processing system, but can alternatively be mounted to any other suitable component and/or otherwise controlled. The aerial system 200 can include one or more sensors. Examples of sensors that can be used include: orientation sensors (e.g., accelerometer, gyroscope, etc.), ambient light sensors, temperature sensors, pressure sensors, optical sensors, acoustic sensors (e.g., microphones), voltage sensors, current sensors, or any other suitable sensor.

The power supply of the aerial system functions to power the active components of the aerial system. The power supply is preferably mounted to the body, and electrically connected to all active components of the aerial system (e.g., directly or indirectly), but can be otherwise arranged. The power supply can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCd, NiMH, etc.), or batteries with any other suitable chemistry.

4. Method

As shown in FIG. 5, the method for aerial system control includes: selecting a first region of an imaging element S120, displaying an image from the first region S120, receiving a user input S130, changing a position of the aerial system S140, selecting a second region of a second imaging element S150, and displaying an image from the second region S160. The method functions to allow a user to remotely control the aerial system in an intuitive manner through the user device. Processes of the method are preferably performed sequentially, but can alternatively be performed in parallel or in any other suitable order. Multiple instances of the method (or portions thereof) can be concurrently or serially performed for the same user device-aerial system pair. Each client (e.g., user device) is preferably connected to a single aerial system at any given time, but can alternatively be connected to and/or control multiple aerial systems concurrently.

Selecting a first region of an imaging element S110 can function to determine an initial or default imaging element region associated with the aerial system. The imaging element can be an optical sensor (e.g., all or subset of a camera active region), image frame, image, set of images, or video sampled by the optical sensor, or be any other suitable image- or imaging-related element. The imaging element is preferably associated with the aerial system (e.g., optical sensor of the aerial system, image frame of the aerial system camera, image captured by the aerial system camera, etc.), but can additionally or alternatively be associated with any other suitable system. Accordingly, the first region of the imaging element can be a region of an optical sensor (e.g., all or a subset of a camera active region), a region of an image frame, image, set of images, or video (e.g., a set of pixel locations of each image or video frame), or a region of any other suitable image- or imaging-related element. The first region can be a default region, or can be selected based on aerial system parameters (e.g., flight parameters such as orientation, velocity, and/or position; optical sensor status; etc.), selected by the user (e.g., preselected, selected in real time at a user device, etc.), selected based on image processing (e.g., object recognition, image segmentation, etc.), and/or selected in any other suitable way. The first region is preferably automatically selected by the aerial system (e.g., prior to image transmission to the remote device), but can alternatively be selected by the remote device (e.g., based on auxiliary sensor measurements received from the aerial system), server system, or by any other suitable computing system. The region is preferably selected in near-real time (e.g., before, immediately after, or within a short duration after the image frames are received), but can alternatively be selected at any other suitable time.

The region preferably includes (e.g., encompasses, defines) a regular array of pixels in a contiguous area (e.g., every pixel in the area, every second pixel in the area, every third pixel of every second row in the area, etc.), but can alternatively include multiple non-contiguous areas, irregular pixel arrangements, and/or be any other suitable region. For example, the region can define a rectangle (e.g., be rectangular, be substantially rectangular, be rectangular except for small excisions removed from the rectangle and/or extensions added on to the rectangle, etc.).

The region can be defined by a portion of one or more of the imaging element edges (e.g., occupy the entire area of the sensor, image frame, image, etc.; border one or more of the imaging element edges; extend between the two horizontal edges and lie between the two vertical edges; etc.), can touch one or more of the edges (e.g., be inscribed within the imaging element edges, touch one imaging element edge with one region corner, etc.), or can be strictly inside of the imaging element edges (e.g., occupy a central area; occupy an area near, but not in contact with, one or more edges; etc.). The region can be arranged symmetrically (e.g., with respect to one or more lines of symmetry of the imaging element) or asymmetrically within the imaging element. The region can occupy the entire area of the imaging element, or can occupy any suitable fraction thereof (e.g., 90%, 75%, 10%, at least 50%, 40-90%, etc.). The region can include an orientation relative to the imaging element (e.g., angle between a rectangular region edge and an imaging element edge, orientation associated with a circular region, etc.). However, the region can alternatively have any other suitable arrangement, shape, and/or size with relation to the imaging element. Other regions selected during performance of the method (e.g., the second region, selected in S150) can have similar properties as the first region, different properties than the first region, and/or any other suitable properties.

Figure 26:
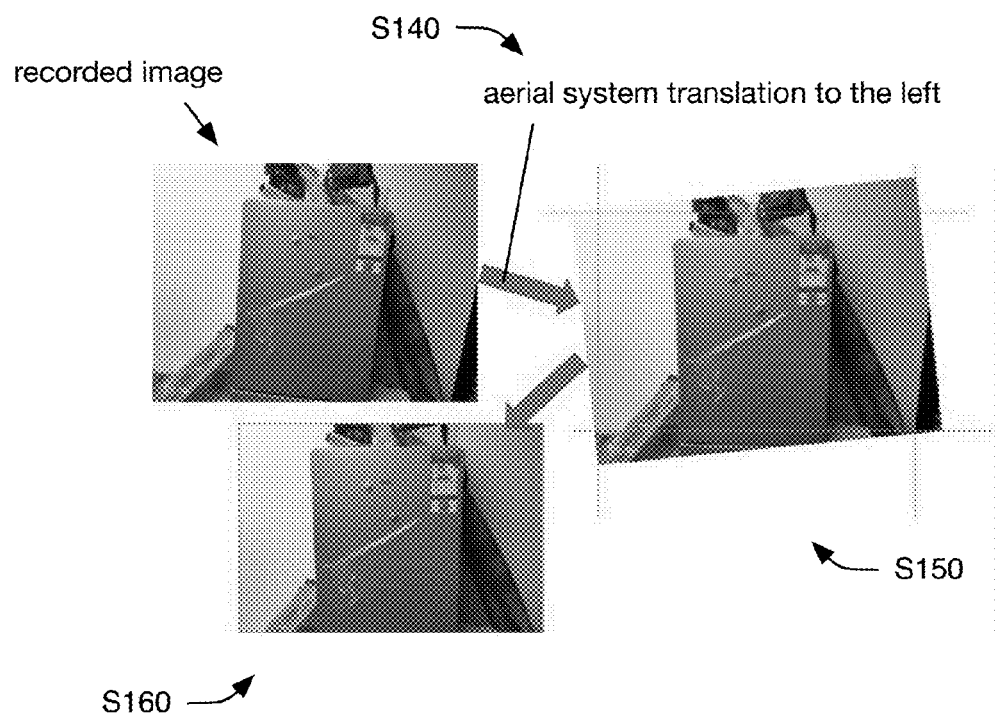
FIG. 26 is a specific example of compensating for aerial system movement.

In one embodiment, regions can be automatically selected to stabilize the video (specific example shown in FIG. 26). In a first example, the region orientation can be selected based on the aerial system orientation (e.g., aerial system body orientation, camera orientation, etc.; orientation relative to a gravity vector, orientation change or rate of change, etc.), which can enable camera tilt compensation. The orientation can be determined based on aerial system sensor readings (e.g., inertial measurement unit readings such as accelerometer and/or gyroscope readings, preferably recorded concurrent with the video capture), based on image analysis (e.g., analysis of frames of the video, of other images captured by an aerial system camera, of images captured of the aerial system, etc.), based on user input (e.g., image rotation request), and/or determined in any other suitable way. For example, the region orientation can be determined based on the aerial system roll angle, yaw angle, pitch angle, translation speed, relative rotor speeds, or based on any other suitable aerial system flight parameter. In a specific example of tilt compensation, a roll angle between an edge of the broad face of the sensor (e.g., active surface edge) and a projection of a gravity vector onto the broad face is determined. In this first specific example, the region orientation and/or change in region orientation relative to another selected region is substantially equal in magnitude to (e.g., within 1° of, within 5° of, within 10° of, etc.) and opposite in direction of the roll angle. However, the region orientation can be otherwise determined based on the roll angle. The region can be selected to maintain a constant size (e.g., scale, resolution, etc.) of an image corresponding to the region, regardless of whether or not the aerial system is rotated, such that the size of a compensated image is indistinguishable from the size of an uncompensated image, but can alternatively can result in different image sizes or be otherwise selected.

The method can include receiving a video, such as a video including an image from the first region, from a camera of the aerial system. The video can be received by a processor of the aerial system, by a remote computing system (e.g., user device, remote server, etc.), and/or by any other suitable system. The video frames can include only pixels from the first region (e.g., be cropped to the first region), include pixels from both within and outside of the first region, or include pixels from any suitable locations of the image frame. Although a video typically includes many frames per second, a person of skill in the art will understand that the video can be any series of images captured by the camera.

Displaying an image from the first region S120 functions to display information relevant to aerial system flight to the user. The method preferably includes sending images (e.g., video frames), recorded by the aerial system (e.g., a camera of the aerial system), to the user device. This can function to stream a video stream from the aerial system to the user device. The aerial system preferably sends the images directly to the user device through a wireless connection (e.g., a BLE connection, WiFi connection, analog RF connection, etc.), but can alternatively send the images indirectly to the user device (e.g., via a remote computing system) or otherwise send the images to the user device. The images (e.g., image frames) can be timestamped, associated with sensor measurements, such as orientation sensor measurements (e.g., concurrently recorded sensor measurements, sensor measurements recorded within a threshold time period, etc.), or associated with any other suitable information.

Figure 25:
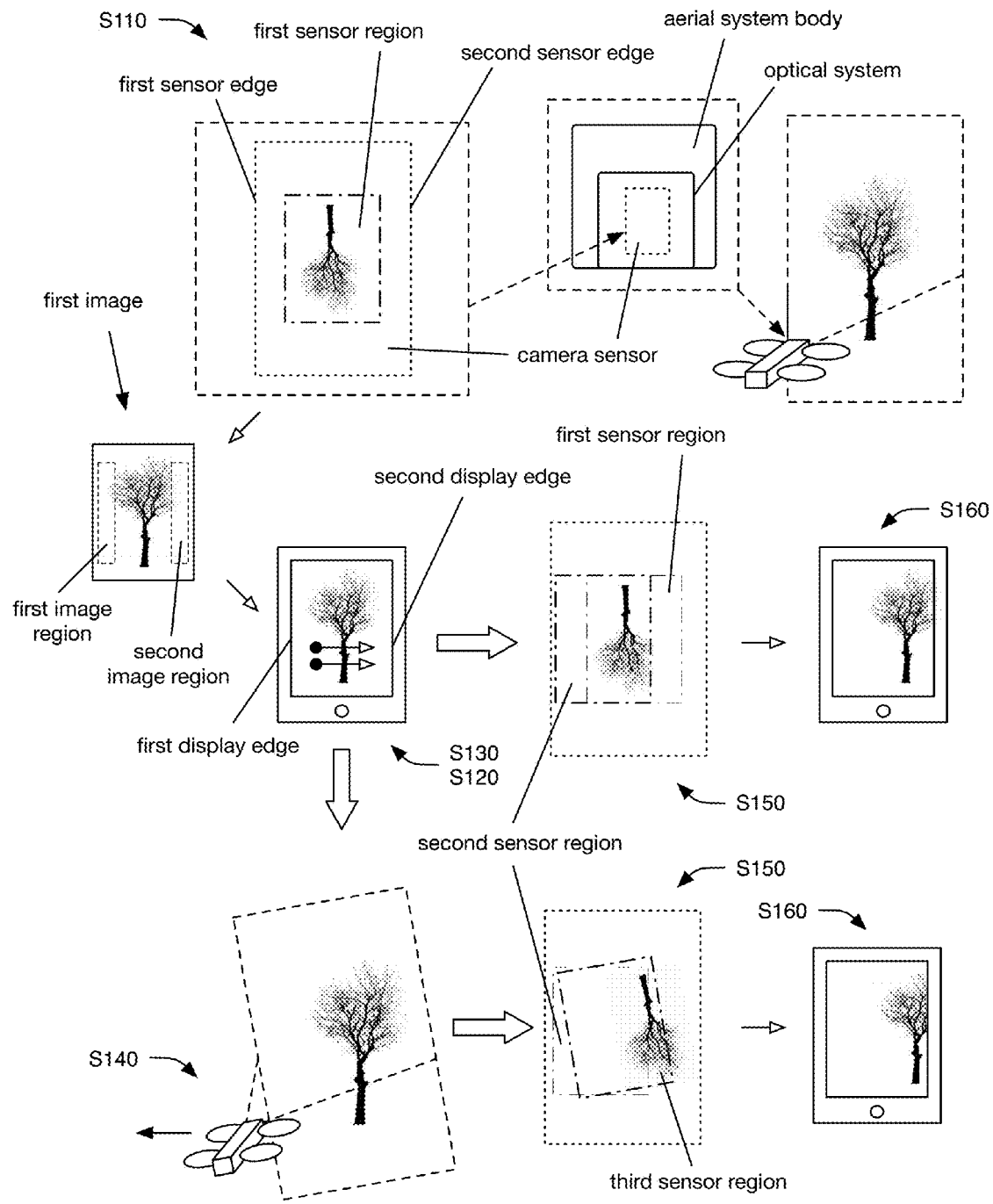

S120 preferably includes displaying the image(s) in a display area, such as the display area of the user device (example shown in FIG. 6). The display area can be an entire display (e.g., display screen of the user device), a portion of a display, can span all or portions of multiple displays, or can be any other suitable display area. The display is preferably a touch-sensitive display, more preferably having an input area entirely overlapping the display area. In an example, the method includes receiving an image sampled by a first sensor region, wherein the image includes a first image region sampled proximal a first sensor edge and a second image region sampled proximal a second sensor edge opposing the first sensor edge. In this example, S120 includes controlling the touch-sensitive display (e.g., of the user device) to display the first image within the entirety of a display area of the touch-sensitive display. Further, in this example, the display area includes a first display edge and a second display edge opposing the first display edge, the first image region is displayed proximal the first display edge, and the second image region is displayed proximal the second display edge (e.g., as shown in FIG. 25).

The image or images are preferably displayed (e.g., the video played) in real- or near-real time (e.g., within a time interval of image capture, such as 1 ms, 10 ms, 20 ms, 50 ms, 1 s, etc.; wherein sending, processing, and displaying the images are performed with minimal delay after image capture). Additionally or alternatively, the image(s) can be displayed after a delay interval (e.g., predetermined delay, delay based on aerial system operation status, etc.) or after any suitable period of time. Video frames are preferably displayed in order and for an amount of time corresponding to the capture frame rate, but alternatively may be displayed in any suitable order and for any suitable period of time. For example, a single image can be displayed for an extended period of time (e.g., throughout performance of the method, 1 min, 10-60 s, 1-30 min, etc.). The images are preferably sent and displayed throughout performance of the method (e.g., continuously throughout, at intervals throughout, etc.), but can additionally or alternatively be sent and/or displayed during a specific interval, at a single time, and/or at any other suitable time.

Receiving a user input S130 functions to allow a user to control the aerial system. The user input preferably includes a touch input (e.g., drag input, tap input, hold input, etc.), more preferably received by a touch-sensitive display. The user input is preferably received on a video displayed by a user device, which functions to allow a user to interact with the video, wherein the aerial system is automatically controlled to achieve the desired video movement indicated by the user input. The user input is preferably received by the control client, more preferably at an input area of the control client (e.g., the input frame, via the input device of the user device), but can alternatively be received by any other suitable input device. The input area is preferably overlaid over, and encompasses substantially the entirety of, the display area of the client and/or user device displaying the video (e.g., wherein the input area is the same size as or larger than the display area; wherein the input area overlaps 90% or more of the display area, etc.), such that the user input can be received at any part of the display area. Alternatively, the input area can be smaller than and overlay a subset of the display area, be larger than and overlay some or all of the display area, be separate from the display area, be adjacent the display area, define virtual joysticks that control different aspects of aerial system control (e.g., separate from or overlapping the display area), or otherwise defined.

The user input is preferably received during image or video display. Accordingly, the user input (e.g., drag input) can be received within a display area concurrent with the display of the image from the first region in the display area. In one example, in which S120 includes controlling the touch-sensitive display of the user device to display the first region of video, S130 includes receiving a drag input including a translation vector (e.g., from start point to end point, from start point to intermediate hold point, from first to second hold point, from first to second extremum, etc.) from the touch-sensitive display. In this example, the first region of a video (e.g., selected in S110) is displayed throughout a time interval, and the drag input is preferably received during the time interval. The translation vector can define a horizontal component parallel to a horizontal edge of the touch-sensitive display, a vertical component parallel to a vertical edge of the touch-sensitive display (and/or perpendicular to the horizontal edge), and/or any other component aligned along any suitable axis (e.g.; axis along an input plane, such as a diagonal axis; axis at an angle to the input plane; etc.).

Additionally or alternatively, the user input can include user device manipulation (e.g., tilting, translating, rotating, etc.), mechanical control input (e.g., joystick, button, switch, slider, etc.), audio input (e.g., voice command, clapping input, audio location input, etc.), optical input (e.g., light signal, input discerned by image recognition, eye-tracking input, etc.), mental input (e.g., based on EEG signals), and/or any other suitable input, and can be received in any suitable way at any suitable time. The aforementioned inputs can be determined by the user device sensors, external sensors monitoring the user device, or determined by any other suitable system.

Changing a position of the aerial system S140 functions to effect aerial system control. Changing the position S140 is preferably based on the user input, and can include generating operation instructions for the aerial system to adjust the camera angle based on the user input, which functions to interpret a desired video movement into control instructions for the aerial system to achieve the desired video movement (e.g., change in viewpoint, perspective, etc.).

The operation instructions are preferably generated by the control client (e.g., by the user device running the control client), but can alternatively be generated by the aerial system (e.g., wherein the user inputs and/or control instruction intermediaries are sent to the aerial system), a remote computing system (e.g., wherein the user inputs and/or control instruction intermediaries are sent to the aerial system), or any other suitable computing system. The operation instructions can be target aerial system operation parameters (e.g., 5 degrees to the right, 2 meters up, etc.), aerial system control instructions (e.g., voltages for an aerial system component, etc.), or be any other suitable set of instructions. In a first variation, the user device: converts the user inputs into control instructions and sends the control instructions to the aerial system, wherein the aerial system operates based on the control instructions. In a second variation, the user device converts the user input into target operation parameters and sends the target operation parameters to the aerial system, wherein the aerial system converts the target operation parameters into control instructions and automatically operates based on the control instructions. In a third variation, the user device sends the user inputs to the aerial system, wherein the aerial system converts the user inputs into control instructions and automatically operates based on the control instructions. However, the operation instructions can be otherwise generated.

Generating the operation instructions can include interpreting the user input based on a set of predetermined relationships between the user input parameters and aerial system actions. User input parameters can include: the number of concurrent, discrete inputs (e.g., touches); the duration of each continuous input; the distance of each continuous input; the location of each input (e.g., the touch coordinates for each touch, beginning coordinates, end coordinates, etc.); or any other suitable parameter. Aerial system actions can include: actuating the optical system, yawing the aerial system (e.g., about a transverse aerial system axis intersecting the optical system, about a central transverse axis, about an axis parallel the transverse aerial system axis and intersecting a target object, etc.), rolling the aerial system (e.g., about the longitudinal axis, about an axis normal to the camera sensor), pitching the aerial system (e.g., about the lateral axis), translating the aerial system vertically (e.g., adjusting the aerial system height relative to a ground plane), translating the aerial system horizontally (e.g., adjusting the lateral relationship between the aerial system and a target object, moving the aerial system closer to or farther from the target object, etc.), or otherwise actuating the aerial system. User inputs can include touch inputs, remote device manipulation (e.g., tilting, translating, etc.), or any other suitable input. In a specific example, a single concurrent touch (e.g., single-finger drag, etc.) is mapped to aerial system and/or optical system rotation, while multiple concurrent touches (e.g., multi-finger drag, pinch, etc.) are mapped to aerial system translation.

The operation instructions generated based on a user input are preferably independent from the region of the display area in which the user input is received (e.g., such that similar user inputs received at different locations within the display area have similar effects). In one example, in which a first drag input is received at a first region of a display area of a touch-sensitive display and defines a first horizontal component parallel to a horizontal edge of the touch-sensitive display, S140 includes rotating the aerial system in a first direction about a yaw axis, based on the first horizontal component. In this example, the method can further include receiving a second drag input from the touch-sensitive display (e.g., wherein the touch-sensitive display received the second drag input at a second region of the display area non-overlapping with the first region of the display area), wherein the second drag input includes a second translation vector codirectional with the translation vector of the first drag input, the second translation vector defining a second horizontal component codirectional with the horizontal component. In this example, the method can further include rotating the aerial system in the first direction about the yaw axis again, based on the second horizontal component. However, the region of the display area in which a user input is received can alternatively affect the operation instructions generated based on that user input (e.g., a drag input in a 'yaw' region can control aerial system yaw, while a similar drag input in a 'translation' region can control aerial system translation).

The duration, distance, speed, and/or acceleration of aerial system action (e.g., rotation speed, translation speed, etc.) can be related to: the temporal duration of continuous user input, the distance or length of continuous user input, the speed and/or acceleration of the user input position change or any other suitable user input parameter. The duration, distance, speed, and/or acceleration of aerial system action can be: proportional to the user input parameter, inversely proportional to the user input parameter, a monotonic function of the user input parameter (e.g., increase monotonically or strictly monotonically with the user input parameter, decrease monotonically or strictly monotonically with the user input parameter), or be otherwise related. For example, S140 can include rotating the aerial system based on a value of a rotation parameter, wherein the value is a monotonically increasing function of a magnitude of an aspect of a user input (e.g., component of a drag vector, such as vertical or horizontal component). In a specific example, the rotation parameter is the aerial system rotation speed. The value of aerial system parameter change mapped to the user input parameter can be: constant, proportionally scaled with the aerial system parameter value or different aerial system parameter value (e.g., distance from the remote device), inversely scaled with aerial system parameter value, or otherwise related. In one example, the same linear user input can be mapped to a first translation distance when the aerial system is beyond a threshold distance away from the remote device, and mapped to a second translation distance when the aerial system is within a threshold distance away from the remote device, wherein the first translation distance is larger than the second translation distance.

In a first variation, the user inputs are indicative of field of view rotations (e.g., turn left, turn right, turn up, turn down), wherein the rotation inputs are mapped to a blend of optical system and aerial system rotation actions. The aerial system is preferably translated in the opposing direction as the rotation input arcuate direction, but can alternatively be translated in the same direction.

Figure 7:
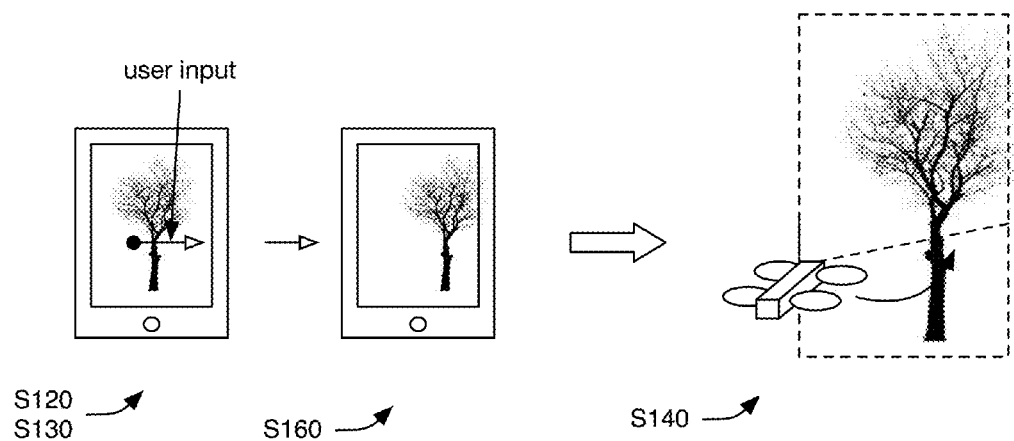
FIGS. 7-25 are specific examples of different user input and the respective mapped aerial system actions.
Figure 8:
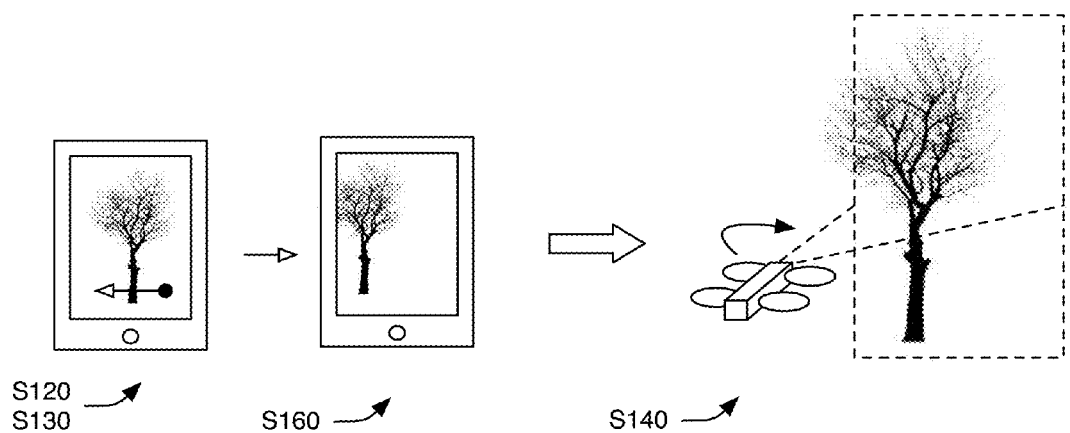

A first embodiment of the first variation includes rotating the aerial system about a yaw axis based on the horizontal component (specific examples shown in FIGS. 7-8). In this embodiment, a user input to rotate the field of view to the left (e.g., move the camera FOV to the left; move the video perspective to the left; change the horizontal perspective to the left but not the vertical perspective; etc.) is mapped to control instructions to yaw the aerial system counterclockwise (e.g., positive yaw; counterclockwise as viewed from above relative to a gravity vector, aerial system top, camera top, etc.) about a yaw axis, and/or a user input to rotate the field of view to the right (e.g., move the camera FOV to the right; move the video perspective to the right; change the horizontal perspective to the right but not the vertical perspective; etc.) is mapped to control instructions to yaw the aerial system clockwise (e.g., negative yaw; clockwise as viewed from above relative to a gravity vector, aerial system top, camera top, etc.) about a yaw axis (e.g., same or different yaw axis). The yaw axis can intersect the aerial system or be external the aerial system. When the yaw axis is external the aerial system, the system generating the control instructions can automatically: determine the target object distance from the aerial system, determine the yaw axis location relative to the aerial system based on the target object distance, and determine the control instructions based on the yaw axis location (e.g., transform or shift the control instructions accordingly). Alternatively, the yaw axis distance from the aerial system can be substantially constant, wherein the aerial system yaws along the same arc angle, irrespective of the target object distance from the aerial system. However, the left and/or right rotation user input can be otherwise mapped.

The left rotation user input can include: a single-touch hold (e.g., temporally continuous signal) and drag (e.g., a series of temporally continuous signals, each (or substantially all of, a majority of, etc.) temporally successive signal further along a positive x-axis than the last signal, etc.) to the right of the display area and/or input area (e.g., toward a right vertical edge of the display); a touch, hold, and drag to the left of the display area and/or input area; a single-touch hold on the left of the display area and/or input area; a series of consecutive taps on the left of the display area and/or input area; a series of consecutive taps on the right of the display area; user device roll counterclockwise (e.g., as determined by the user device orientation sensor); or include any other suitable input pattern with any other suitable set of parameters. For example, the left rotation user input can include a translation vector that defines a horizontal component that points right, and in response, the aerial system can rotate about a yaw axis counterclockwise as viewed from above (e.g., relative to a gravity vector, etc.).

The right rotation user input can include: a single-touch hold and drag (e.g., a series of temporally continuous signals, each (or substantially all of, a majority of, etc.) temporally successive signal further along a negative x-axis than the last signal, etc.) to the left of the display area and/or input area (e.g., toward a left vertical edge of the display); a touch, hold, and drag to the right of the display area and/or input area; a single-touch hold on the right of the display area and/or input area; a series of consecutive taps on the right of the display area and/or input area; a series of consecutive taps on the left of the display area; user device roll clockwise (e.g., as determined by the user device orientation sensor); or include any other suitable input pattern with any other suitable set of parameters. For example, the right rotation user input can include a translation vector that defines a horizontal component that points left, and in response, the aerial system can rotate about a yaw axis clockwise as viewed from above (e.g., relative to a gravity vector, etc.).

Figure 9:
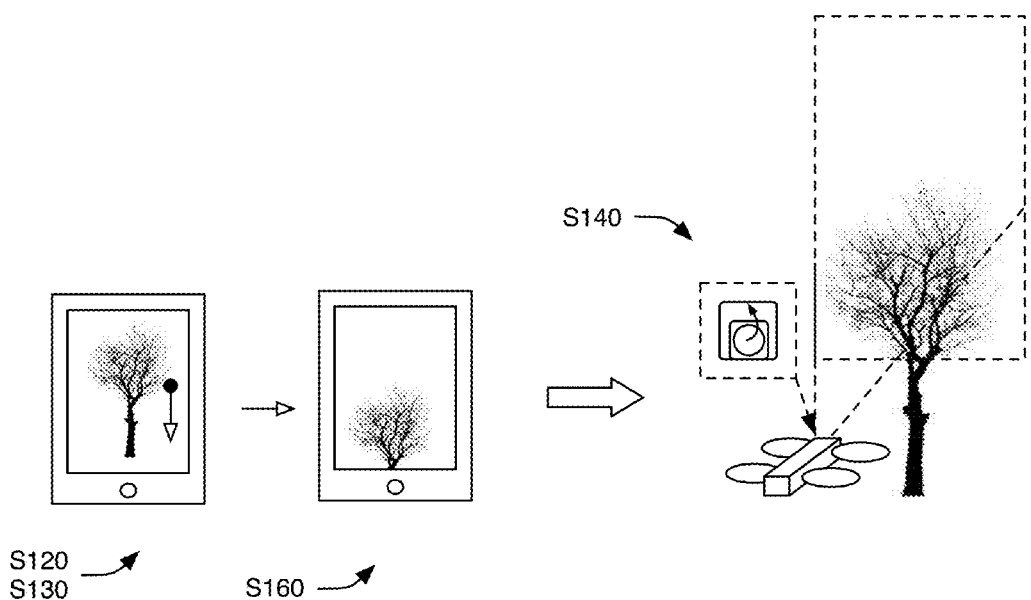
Figure 10:
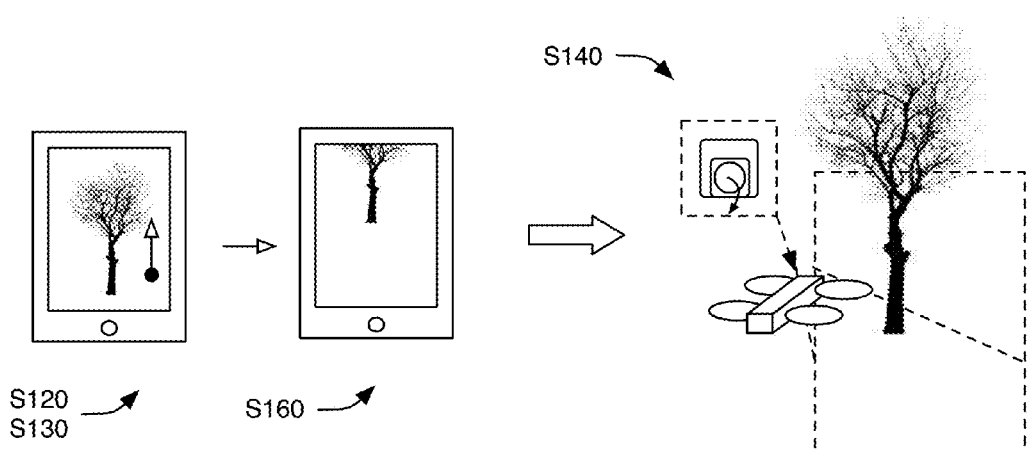

In a second embodiment of the first variation (specific examples shown in FIGS. 9-10), the aerial system includes a gimbal system (e.g., single-axis gimbal system) rotatably mounting the optical sensor to the body. For example, the optical sensor (e.g., camera) can be rotatable about a gimbal axis, wherein the gimbal axis is substantially (e.g., within 1°, within 5°, within 10°, etc.) perpendicular the yaw axis and/or roll axis, and/or substantially (e.g., within 1°, within 5°, within 10°, etc.) parallel the optical sensor active surface (e.g., camera sensor). The optical system angular position and/or gimbal position can be determined based on: user inputs, desired scene changes, the aerial system pitch angle (e.g., wherein the optical system angular position can be dynamically changed to counteract changes in the sampled scene due to aerial system pitch), or otherwise determined. In one example, a user input to rotate the field of view upward (e.g., move the camera FOV upward; move the video perspective to upward; change the vertical perspective upwards but not the horizontal perspective; etc.) is mapped to control instructions to control instructions to pitch the optical sensor upward about the gimbal axis, and/or a user input to rotate the field of view downward (e.g., move the camera FOV downward; move the video perspective downward; change the vertical perspective downwards but not the horizontal perspective; etc.) is mapped to control instructions to pitch the optical sensor downward about the gimbal axis.

The upward rotation user input can include: a single-touch hold and drag (e.g., a series of temporally continuous signals, each (or substantially all of, a majority of, etc.) temporally successive signal further along a negative y-axis than the last signal, etc.) to the bottom of the display area and/or input area (e.g., toward a lower horizontal edge of the display); a touch, hold, and drag to the top of the display area and/or input area; a single-touch hold on the top of the display area and/or input area; a series of consecutive taps on the top of the display area and/or input area; a series of consecutive taps on the bottom of the display area; user device pitch forward (e.g., as determined by the user device orientation sensor); or include any other suitable input pattern with any other suitable set of parameters. For example, the upward rotation user input can include a translation vector that defines a vertical component (e.g., perpendicular to the horizontal edge of the display) that points down, and in response, the camera can rotate upward about the gimbal axis based on the vertical component.

The downward rotation user input can include: a single-touch hold and drag (e.g., a series of temporally continuous signals, each (or substantially all of, a majority of, etc.) temporally successive signal further along a positive y-axis than the last signal, etc.) to the top of the display area and/or input area (e.g., toward an upper horizontal edge of the display); a touch, hold, and drag to the bottom of the display area and/or input area; a single-touch hold on the bottom of the display area and/or input area; a series of consecutive taps on the bottom of the display area and/or input area; a series of consecutive taps on the top of the display area; user device pitch backward, toward the user (e.g., as determined by the user device orientation sensor); or include any other suitable input pattern with any other suitable set of parameters. For example, the downward rotation user input can include a translation vector that defines a vertical component (e.g., perpendicular to the horizontal edge of the display) that points up, and in response, the camera can rotate downward about the gimbal axis based on the vertical component.

In a third embodiment of the first variation, a user input to rotate the field of view upward (e.g., move the camera FOV upward; move the video perspective to upward; change the vertical perspective upwards but not the horizontal perspective; etc.) is mapped to control instructions to pitch the optical system upward about a rotational axis, and/or a user input to rotate the field of view downward (e.g., move the camera FOV downward; move the video perspective downward; change the vertical perspective downwards but not the horizontal perspective; etc.) is mapped to control instructions to pitch the optical system downward about a rotational axis. Alternatively, the upward rotation user input can be mapped to pitch the aerial system upward about a pitch axis (e.g., lateral axis, axis parallel the lateral axis, etc.), or be otherwise mapped, and/or the downward rotation user input can be mapped to pitch the aerial system downward about a pitch axis (e.g., lateral axis, axis parallel the lateral axis, etc.), or be otherwise mapped. The upward and/or downward rotation user input can be the same as in the second embodiment, and/or can be any other suitable input.

In a fourth embodiment of the first variation, a user input to rotate the field of view about an axis normal to the field of view can be mapped to control instructions to roll the aerial system about a roll axis (e.g., longitudinal axis, axis parallel the longitudinal axis, etc.), control instructions to rotate the cropped region of the image, or be otherwise mapped. The roll rotation user input can include: a two-touch hold and drag along a substantially arcuate path; a single touch hold and drag along a substantially arcuate path; user device yaw (e.g., as determined by the user device orientation sensor); or any other suitable input pattern with any other suitable set of parameters. The aerial system preferably rolls in the angular direction of the arcuate path, but can alternatively roll in the opposing direction.

In a second variation, the user inputs are indicative of field of view translations (e.g., move left, move right, move up, move down), wherein the translation inputs are mapped to aerial system translation actions. The aerial system is preferably translated in the same direction as the translation input axis, but can alternatively be translated in the opposing direction. The translation user inputs can be different from the rotation user inputs, but can alternatively be substantially similar. In one example of the latter variation, the same input can be mapped to a FOV rotation action until an input threshold is reached, at which point the input is mapped to a FOV translation action. In a specific example, a continuous single-touch hold on the left of the display can rotate the FOV leftward, up to a 180° rotation, at which point the input is remapped to aerial system translation to the left. However, the translation inputs can be otherwise related to the rotation inputs.

Figure 11:
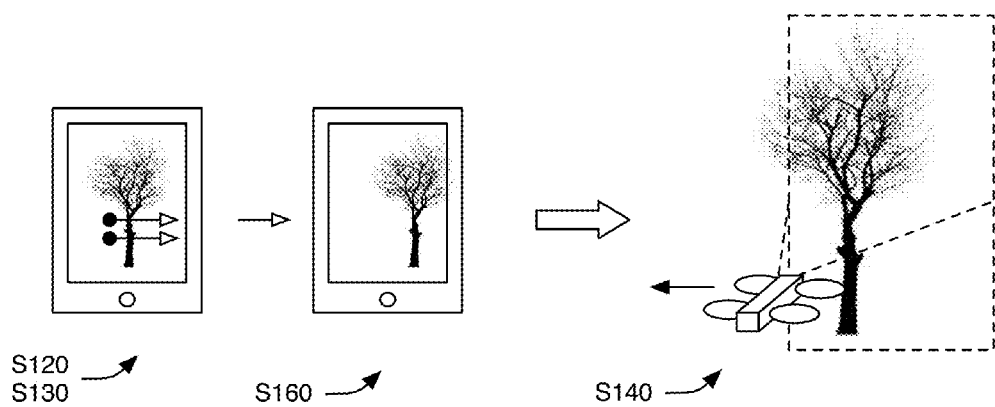
Figure 12:
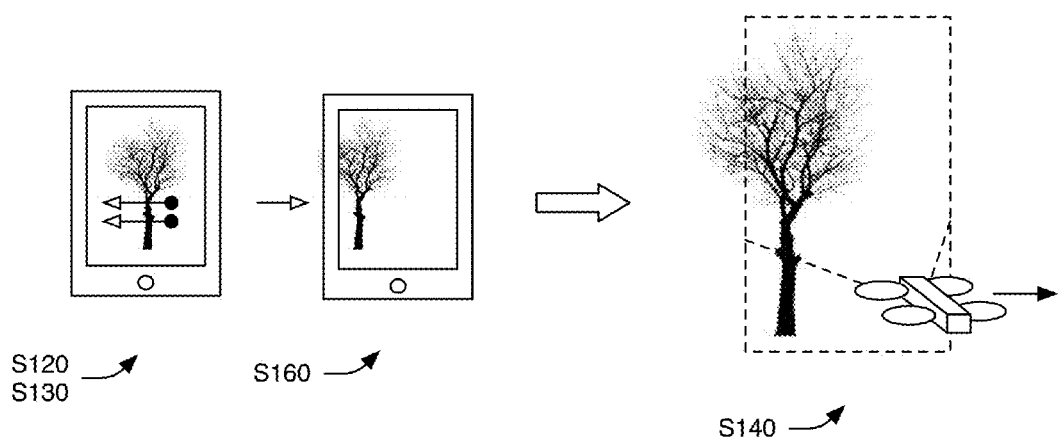
Figure 13:
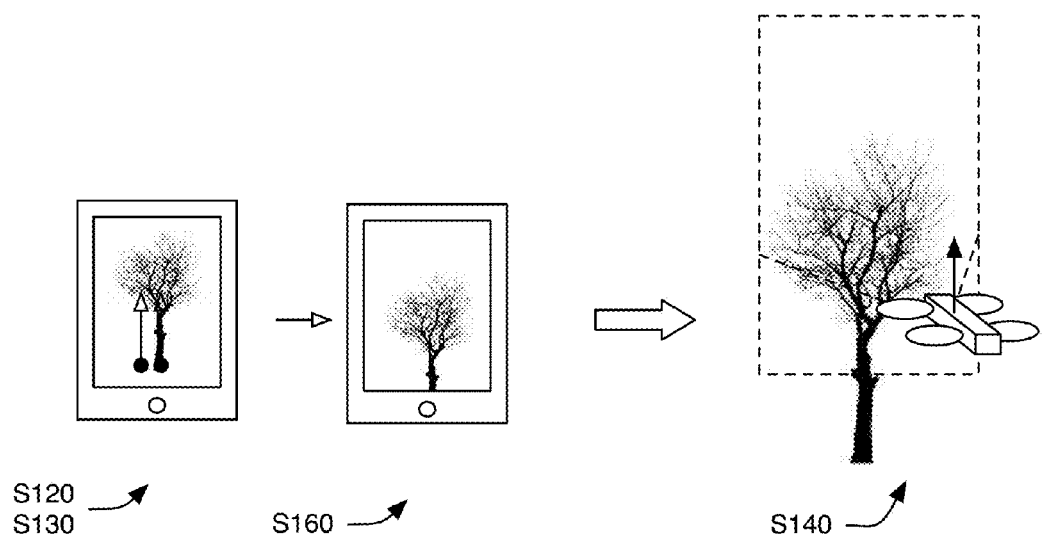
Figure 14:
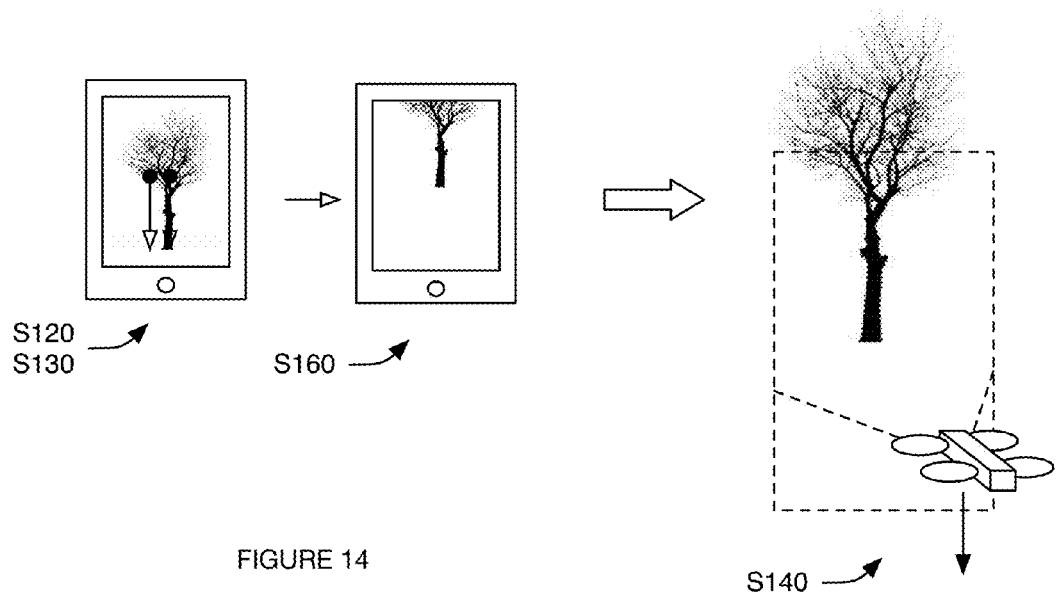
Figure 21:
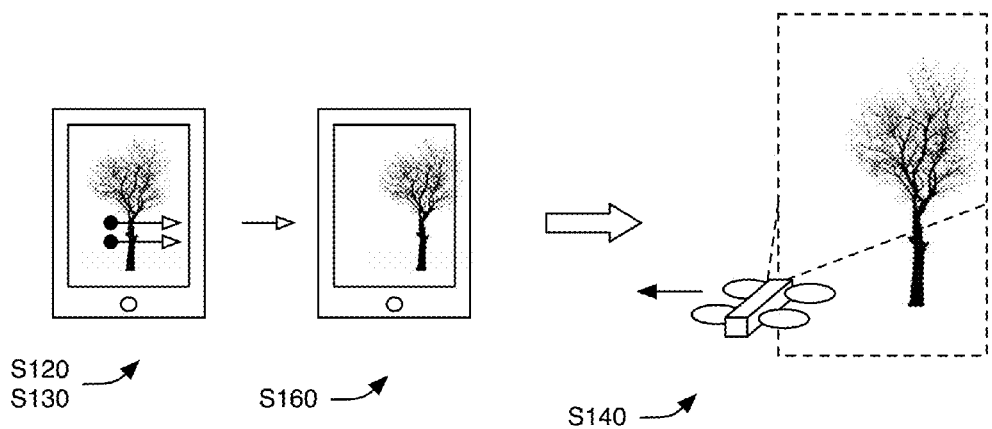
Figure 22:
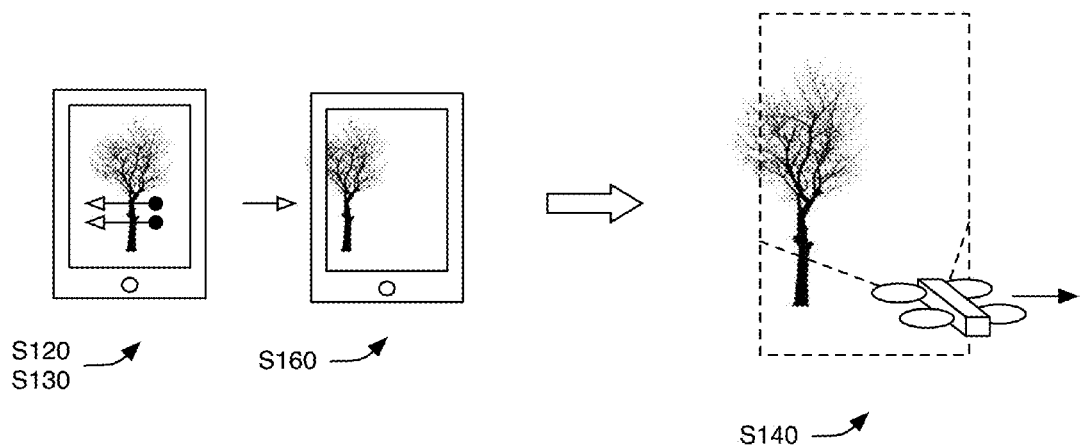

In a first embodiment of the second variation, a user input to translate the field of view horizontally (e.g., laterally translate the camera FOV; laterally translate the video perspective; translate the horizontal perspective but not change the vertical perspective; etc.) can be mapped to: control instructions to translate the aerial system (e.g., along an x-axis) along a lateral translation axis (e.g., parallel or coincident the central lateral axis of the body; perpendicular a gravity vector and parallel the optical sensor active surface; substantially parallel and/or perpendicular these or other references, such as within 1°, 5°, or 10°; etc.), to translate the optical system along the lateral translation axis, or to any other suitable aerial system action. However, the lateral translation user input can be otherwise mapped. The lateral translation user input can include: a two-touch hold and linear lateral drag on the display area and/or input area (e.g., toward a vertical edge of the display); a single-touch hold on one side of the display area and/or input area; a series of consecutive taps on one side of the display area and/or input area; user device roll; or include any other suitable input pattern with any other suitable set of parameters. For example, the lateral translation user input can include a translation vector that defines a horizontal component parallel to a horizontal edge of the display, and in response, the aerial system can translate in a direction substantially parallel (e.g., within 1°, 5°, 10°, etc.) to a broad face of the optical sensor (e.g., camera sensor active surface), based on the horizontal component. In a first specific example (e.g., as shown in FIGS. 11 and 21), the horizontal component points right and the aerial system translates left. In a second specific example (e.g., as shown in FIGS. 12 and 22), the horizontal component points left and the aerial system translates right. However, the translation directions can be reversed, or the input can be mapped to any other suitable translation.

In a second embodiment of the second variation (specific examples shown in FIGS. 13, 14, 17, and 18), a user input to translate the field of view vertically (e.g. vertically translate the camera FOV; vertically translate the video perspective; translate the vertical perspective but not change the horizontal perspective; etc.) can be mapped to: control instructions to translate the aerial system (e.g., along an y-axis) along a vertical translation axis (e.g., parallel or coincident the central vertical axis of the body, parallel or coincident the aerial system yaw axis, parallel a gravity vector, substantially parallel and/or perpendicular these or other references, such as within 1°, 5°, or 10°, etc.), to translate the optical system along the vertical translation axis, or to any other suitable aerial system action. However, the vertical translation user input can be otherwise mapped. The vertical translation user input can include: a two-touch hold and linear longitudinal drag on the display area and/or input area (e.g., along a y-axis of the display area or input area); a single-touch hold on one end of the display area and/or input area (e.g., top end, bottom end); a series of consecutive taps on one end of the display area and/or input area; user device pitch; or include any other suitable input pattern with any other suitable set of parameters.

Figure 15:
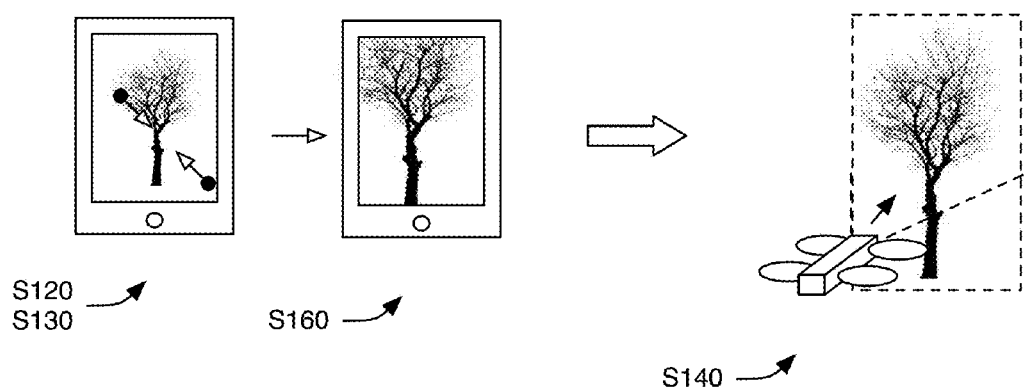
Figure 16:
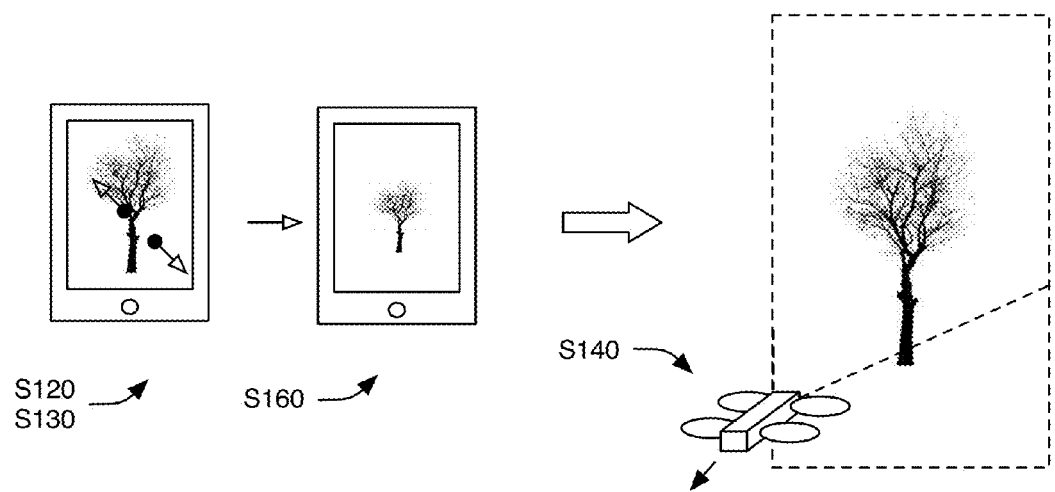
Figure 17:
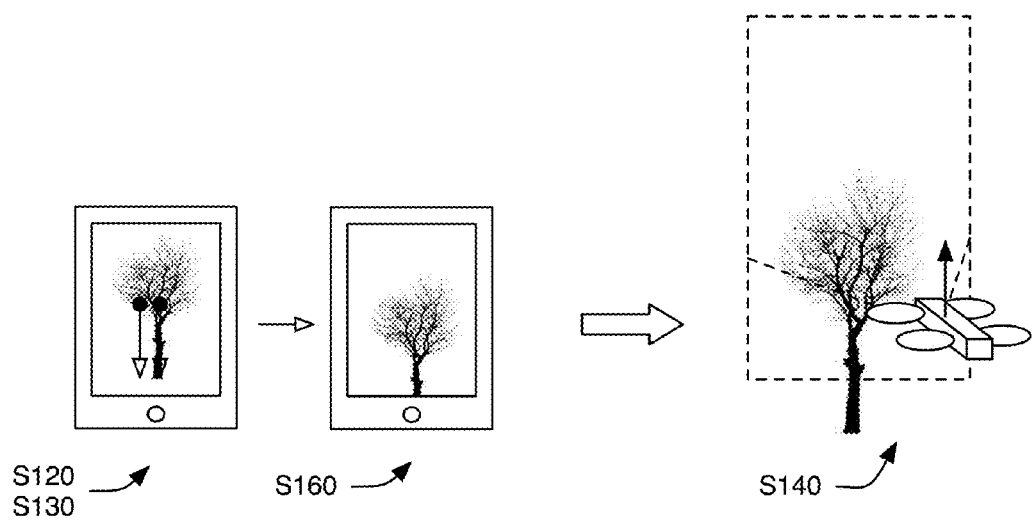
Figure 18:
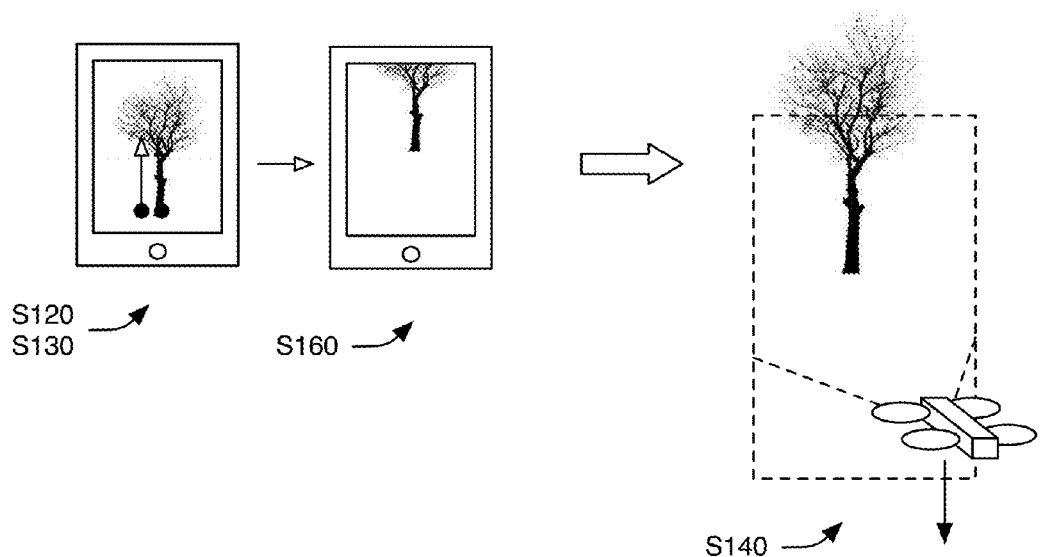

In a third variation, the user inputs are indicative of image scale adjustments, wherein the image scale user inputs are mapped to aerial system translation actions. The aerial system preferably moves away from the target object (e.g., away from the object currently within the FOV; against a normal vector of the active face of the camera; etc.) in response to a zoom out user input, and moves closer to the target object (e.g., toward the object currently within the FOV; along a normal vector of the active face of the camera; etc.) in response to a zoom in user input; specific examples shown in FIGS. 15 and 16. Additionally or alternatively, the user input can be mapped to a blend of optical system zoom and aerial system translation. In one example, in response to receipt of a zoom in user input, the aerial system moves toward the target object up to a threshold distance away from the target object. Upon achieving the threshold distance and receiving further inputs indicative of zooming in, the inputs can be automatically remapped to zooming in the camera (e.g., through digital zoom). When a zoom out user input is received, the camera is zoomed out until the maximum camera focal length is achieved, at which point the user input is remapped to aerial system translation (e.g., translation away from the target object). The threshold distance can be predetermined, set by the user (e.g., entered into the control client), or otherwise determined. The image scale user input can include: a pinching movement (e.g., two-touch moving toward each other), indicative of zooming in; an expanding movement (e.g., two-touch moving away from each other), indicative of zooming out; a sliding movement (e.g., sliding up, indicative of zooming in; sliding down, indicative of zooming out, etc.); or any other suitable user input.

Figure 19:
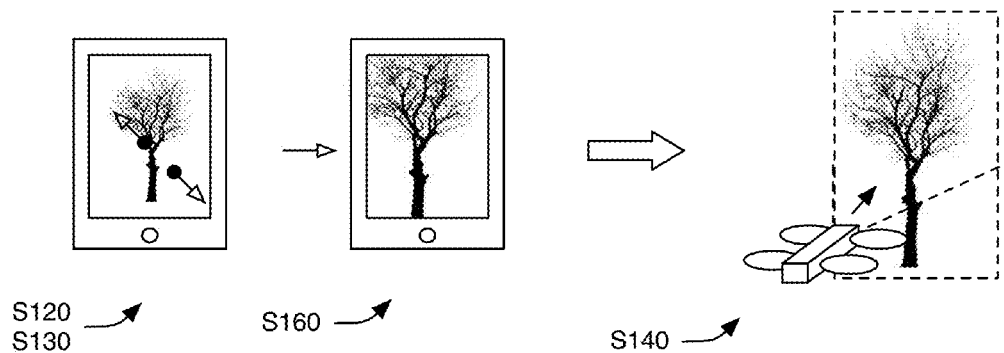
Figure 20:
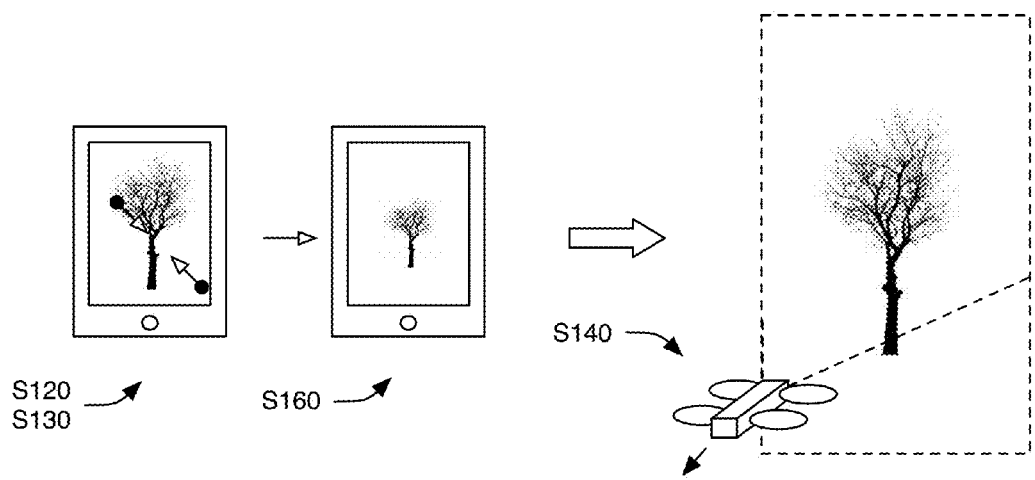

In a fourth variation, the user inputs are indicative of image scale adjustments, wherein the image scale user inputs are mapped to aerial system translation actions. The aerial system preferably moves away from the target object (e.g., away from the object currently within the FOV; against a normal vector of the active face of the camera; etc.) in response to a zoom out user input, and moves closer to the target object (e.g., toward the object currently within the FOV; along a normal vector of the active face of the camera; etc.) in response to a zoom in user input; specific examples shown in FIGS. 19 and 20. Additionally or alternatively, the user input can be mapped to a blend of optical system zoom and aerial system translation. In one example, in response to receipt of a zoom in user input, the aerial system moves toward the target object up to a threshold distance away from the target object. Upon achieving the threshold distance and receiving further inputs indicative of zooming in, the inputs can be automatically remapped to zooming in the camera (e.g., through digital zoom). When a zoom out user input is received, the camera is zoomed out until the maximum camera focal length is achieved, at which point the user input is remapped to aerial system translation (e.g., translation away from the target object). The threshold distance can be predetermined, set by the user (e.g., entered into the control client), or otherwise determined. The image scale user input can include: a pinching movement (e.g., two-touch moving toward each other), indicative of zooming out; an expanding movement (e.g., two-touch moving away from each other), indicative of zooming in; a sliding movement (e.g., sliding up, indicative of zooming out; sliding down, indicative of zooming in, etc.); or any other suitable user input.

Figure 23:
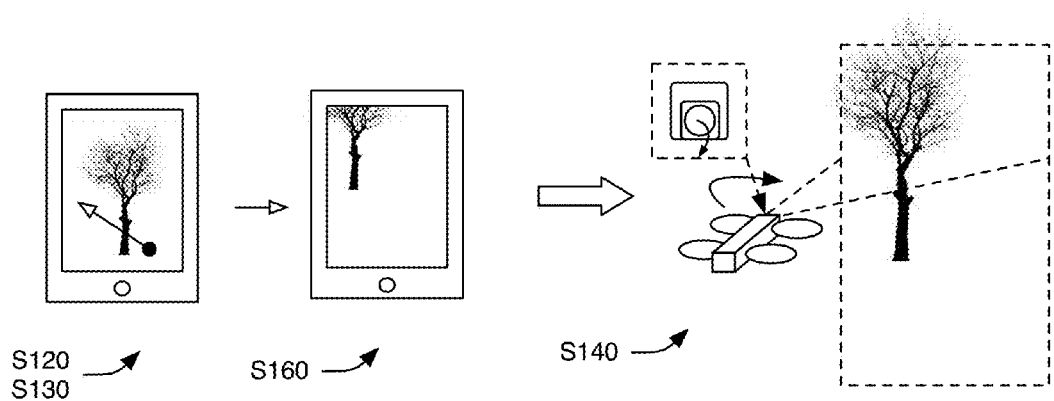
Figure 24:
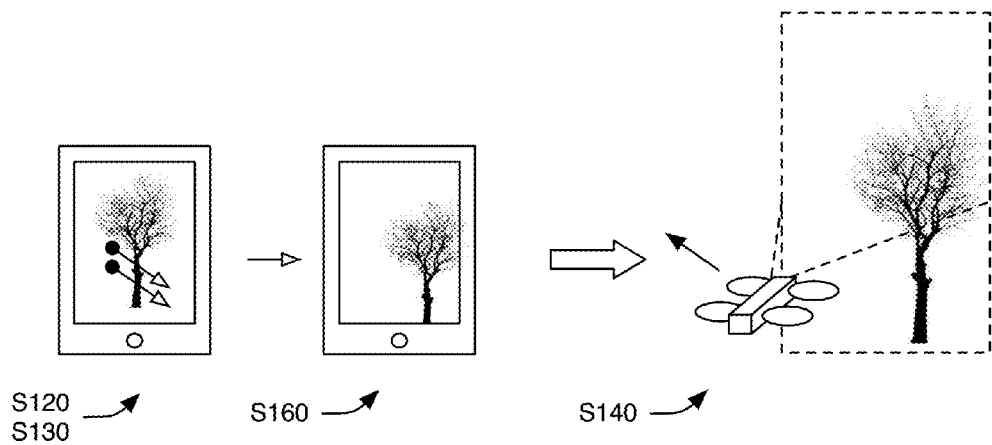

S140 can include mapping a user input to multiple aerial system movements (e.g., as shown in FIGS. 23 & 24). For example, based on a user input corresponding to multiple directional components (e.g., orthogonal components such as a horizontal component and a vertical component), the aerial system can perform a movement corresponding to each directional component. In a first specific example, a one-finger diagonal drag input pointing up and to the right is mapped to both a positive aerial system yaw and a downward camera rotation about a gimbal axis. In a second specific example, a two-finger diagonal drag input pointing down and to the right is mapped to an aerial system translation up and to the left. However, the user input can be otherwise mapped to multiple directional commands. In a specific example, a leftward expanding movement (e.g., wherein both finger contact points move left while moving away from each other, wherein the midpoint between the finger contact points moves left, etc.) is mapped to an aerial system translation both rightward and toward the target object.

The aerial system can perform the movements concurrently, at overlapping times, consecutively, in alternating steps (e.g., performing a first step of a yaw movement, then a first step of an elevation increase movement, then a second step of the yaw movement, and then a second step of the elevation increase movement), or with any other suitable timing. Additionally or alternatively, a user input can be mapped to a single aerial system movement (e.g., a predominantly horizontal user input being mapped only to a horizontal aerial system movement, such as yaw or horizontal translation; a predominantly vertical user input being mapped only to a vertical aerial system movement, such as aerial system or camera pitch or vertical translation), or can be interpreted in any other suitable way.

Additionally or alternatively, some or all of the user inputs can be determined based on remote control (e.g., user device) position, orientation, and/or movement. In a first specific example, tilting the user device forward can be mapped to zooming in and/or translating the aerial system toward the target object, and/or tilting the user device backward can be mapped to zooming out and/or translating the aerial system away from the target object. In a second specific example, tilting the user device to the left can be mapped to the aerial system translating to the left, and/or tilting the user device to the right can be mapped to the aerial system translating to the right. In a third specific example, translating the user device to the left can be mapped to the aerial system undergoing a positive yaw, and/or translating the user device to the right can be mapped to the aerial system undergoing a negative yaw. However, any suitable user inputs can be mapped to any suitable aerial system movements.

Selecting a second region of a second imaging element region S150 can function to compensate for aerial system operation. The second imaging element region is preferably the same imaging element region used in S110 (e.g., both regions of the same video, both regions of the same camera sensor, etc.), but alternatively can be an imaging element region temporally preceding the first imaging element region (e.g., beyond or within a threshold time duration), temporally following the first imaging element region (e.g., beyond or within a threshold time duration), spatially adjacent or overlapping the first imaging element region (e.g., recorded concurrently with the imaging element region or recorded at any other suitable time), associated with (e.g., of or captured by) a second optical sensor on the same or different aerial system, or be any other suitable image- or imaging-related element. The second region is preferably selected by the same system as the system that selects the first region in S110, but additionally or alternatively can be selected by any other suitable computing system. The second region is preferably selected in near-real time (e.g., before, immediately after, or within a short duration after the image frames are received), similar to the first region, but can alternatively be selected at any other suitable time. The second region is preferably selected S150 concurrently with changing a position of the aerial system S140, but can additionally or alternatively be selected before S140, after S140, or at any other suitable time. The second region preferably defines a similar area (or areas) as the first region (e.g., a regular array of pixels in a contiguous area, such as an area defining a rectangle), but can alternatively include multiple non-contiguous areas, irregular pixel arrangements, and/or be any other suitable region. Similar to the first region, the second region can have any suitable arrangement, shape, and/or size with relation to the imaging element from which it is selected. The first and second regions can be the same or different sizes, can have the same or different orientation, and can be in the same position as each other, overlap (e.g., share pixels), be contiguous, or be entirely separate. Although S150 refers to a second region, a person skilled in the art will understand that the region can be any suitable region (e.g., third region, fourth region, etc.).

S150 preferably includes compensating for aerial system response lag. For example, aerial system response lag (e.g., behind user input) can be due to an operation instruction generation delay, signal transmission delay, propeller spool up time, aerial system acceleration time (e.g., to begin aerial system movement, to halt or slow aerial system movement, etc.), delays due to the aerodynamics of flight, or delay due to any other suitable effect. Compensating for aerial system response lag can include determining a translation vector associated with the user input and selecting the second region such that the second region is displaced along the translation vector from the first region. The translation vector can be a display vector (e.g., vector from start point to end point or end point to start point of a drag input received on the display, vector aligned along a display axis, etc.), an aerial system vector (e.g., vector along or opposing aerial system motion associated with the user input, vector aligned along an aerial system or optical sensor axis, vector along an optical sensor active surface associated with a drag input on an image sampled by the optical sensor, etc.), or be any other suitable vector, defined relative to any other suitable system component.

In one variation, the first and second regions cooperatively define a translation vector from the center of the first region to the center of the second region. The variation can additionally or alternatively include moving the camera in a direction substantially opposing (e.g., within 1°, 5°, 10°, etc.) the translation vector (e.g., in S140). In a first embodiment of the variation, a camera sensor includes a first sensor edge and a second sensor edge opposing the first sensor edge, and the first and second regions are regions of the camera sensor. In this embodiment, the translation vector defines a horizontal component perpendicular to the first sensor edge, and S140 includes translating the aerial system in a flight direction at an obtuse (e.g., substantially straight, such as within 1°, 5°, 10°, etc.) or straight angle to the horizontal component. In one example of this embodiment, the flight direction is substantially perpendicular (e.g., within 1°, 5°, 10°, etc.) a gravity vector and substantially parallel (e.g., within 1°, 5°, 10°, etc.) a broad face of the camera sensor (e.g., the active surface).

A specific example further includes: receiving a first image sampled by the first region of the camera sensor (first sensor region), the first image including a first image region sampled proximal the first sensor edge and a second image region sampled proximal the second sensor edge; displaying the first image within the entirety of a display area of a touch-sensitive display, the display area including a first display edge and a second display edge opposing the first display edge, the first image region displayed proximal the first display edge and the second image region displayed proximal the second display edge; concurrent with the display of the first image (e.g., first image displayed at some point during the drag input, first image displayed throughout the entire drag input, etc.), receiving a drag input from the touch-sensitive display, the drag input received within the display area, the drag input including a drag vector extending toward the second display edge (e.g., and away from the first display edge); and selecting a second region of the camera sensor (second sensor region) based on the drag input, wherein the center of the first region is more proximal the second sensor edge (e.g., and more distal the first sensor edge) than the center of the second region.

In an example of compensating for aerial system response lag, wherein a video is received from the aerial system camera (e.g., wherein the regions are selected from the video, selected from the camera sensor that samples the video, etc.), S110 can include cropping out one or more edges of every image frame (of the video); and in response to receipt of a user input S130 indicative of aerial system movement in a first direction, S150 can include cropping out less of a first image edge, and cropping out more of a second image edge. This can function to give the appearance of video frame motion until the aerial system catches up with (e.g., performs) the specified action. In one example, each videoframe is cropped to show only the center of the frame. In response to receipt of a lateral user input to translate the aerial system to the left, each subsequent videoframe can be cropped to show a frame region left of center. Upon aerial system translation (e.g., as determined from the aerial system accelerometer or gyroscope), subsequent videoframes can be cropped to show only the frame center again. The selected region can be adjusted gradually (e.g., moving an incremental amount for each of several video frames, such as all the video frames to be displayed during the expected delay period), adjusted suddenly, adjusted based on the user input speed (e.g., tracking a drag input, such as moving an image frame region to maintain its position under the finger used for the drag input), or adjusted at any other suitable rate.

Compensating for the aerial system response lag can additionally or alternatively include recovering from a second region selection (e.g., re-centering the region selection, shifting the displayed region back to the first region, etc.). The recovery type, direction, speed, accleration, or other recovery parameter can be predetermined, automatically determined based on aerial system parameters (e.g., flight speed, angular position, target position, etc.), or otherwise determined. In one variation, after selecting a second region displaced from the first region in a first direction, the method can include selecting a third region displaced from the second region in a second direction, wherein the first and second directions cooperatively form an obtuse or straight angle (e.g., antiparallel; oppose each other; substantially oppose each other, such as within 1°, 5°, 10°, etc.; have vertical and/or horizontal components that oppose each other; etc.). For example, the center of the third region can be between the centers of the first and second regions, can be substantially coincident the center of the first region (e.g., wherein the third region substantially overlaps the first region, wherein the third region is rotated relative to the first region, etc.), can oppose the center of the second region across the center of the first region, or can have any other suitable position relative to the other regions. The centers can be considered substantially coincident if they are within a threshold distance (e.g., 5, 10, or 50 pixels; 1, 2, or 10 mm; etc.) or within a threshold fraction (e.g., 1%, 5%, 10%, etc.) of a dimension associated with the region (e.g., a length or width of the region or the imaging element the region is selected from).

In a first embodiment of this variation, the region selection is recovered during the aerial system movement (e.g., recovered gradually throughout the movement). For example, the method can additionally include, while rotating the aerial system about the yaw axis based on a user input: receiving a third video; selecting a third region of the third video, wherein the third region is between the first and second regions (e.g., not overlapping either region, overlapping one or both regions); and displaying the third region of the third video (e.g., at the touch-sensitive display). This example can further include (e.g., still during the aerial system rotation, after the aerial system rotation, after displaying the third region of the third video, etc.) selecting a first region of the fourth video, wherein the first region of the fourth video is in the same position as the first region of the first video, and displaying the first region of the fourth video (e.g., at the touch-sensitive display). In a specific example, after displaying the second region of the second video, subsequent intermediate regions are selected and displayed to gradually move the region selection back toward the first region (e.g., the center region).

In a second embodiment of this variation, the region selection is recovered during or temporally near (e.g., within 1, 2, or 10 s, etc.) a change in the aerial system movement (e.g., return to hovering, movement direction change, etc.). This can function to compensate for lag associated with the aerial system movement change (e.g., lag in responding to a stop command, acceleration lag, etc.). For example, after selecting a second region rotated in a first direction relative to the first region and beginning to translate the aerial system (e.g., in a direction substantially parallel to the camera sensor active surface), the method can additionally include: receiving a third video from the camera; selecting a third region of the third video (e.g., wherein the center of the third region is substantially coincident with the center of the first region, wherein the third region is rotated relative to the first region in a direction opposite the first direction); and displaying the third region of the third video (e.g., at the touch-sensitive display). In a first specific example, during most of the aerial system movement, regions near the second region are selected and displayed, and near the end of aerial system movement, regions closer to the first region are selected to compensate for the aerial system deceleration time. In a second specific example, intermediate regions are selected and displayed to gradually move the region selection back toward the first region during the aerial system movement, and near the end of aerial system movement, regions past the first region are selected to compensate for the aerial system deceleration time (after which, further intermediate regions can be selected and displayed to again gradually move the region selection back toward the first region). However, the aerial system response lag can be otherwise compensated for.

S150 can additionally or alternatively include compensating for aerial system rotation (e.g., as described in S110), which can occur when the aerial system rotates or translates. This functions to stabilize the resultant image, which would otherwise appear to rotate with the aerial system. For example, the aerial system can roll when rotating laterally or translating horizontally. In a second example, the aerial system will pitch when moving forward or backward. Compensating for aerial system rotation preferably includes selecting the orientation of the second region. For example, the second region can be rotated relative to the first region (e.g., by an amount substantially equal to an aerial system roll angle, such as within 1°, 5°, or 10°). In a specific example, a second camera sensor region is rotated about a roll axis in a first direction relative to a first camera sensor region, the roll axis normal to a broad face of the camera sensor (e.g., active surface), and an aerial system translation movement includes rotating the aerial system about the roll axis in a second direction opposite the first direction. In this specific example, the second region is preferably substantially upright (e.g., an edge of the second region substantially aligned with a gravity vector, such as within 1°, 5°, or 10°) during the capture of images (e.g., to be displayed in S160) from the second region.

In a first variation of S150, the second region is selected based on the user input, preferably concurrent with changing a position of the aerial system based on the user input. In a first example, the user input is a drag input including a translation vector (e.g., vector from start point to end point; component of a vector associated with the drag input, such as a horizontal or vertical component; etc.), and the second region is translated along the translation vector relative to the first region. In a second example, the user input is a drag input received within a display area of a touch-sensitive display, the display area including (e.g., bordered by) a first display edge and a second display edge opposing the first display edge. In this example, the drag input includes a drag vector (e.g., vector from start point to end point) extending away from the first display edge toward the second display edge. Furthermore, in this example, an image sampled by a first sensor region is displayed within the entirety of the display area (e.g., concurrent with receiving the drag input), wherein the image includes a first image region sampled proximal a first sensor edge and a second image region sampled proximal a second sensor edge opposing the first sensor edge, the first image region is displayed proximal the first display edge, and the second image region is displayed proximal the second display edge. In this example, the second region is selected based on the drag input such that the center of the first region is more proximal the second sensor edge than the center of the second region.

In a first embodiment of this variation, in response to a user input to move the field of view laterally (e.g., rotate left, translate left, rotate right, translate right), the second region is displaced laterally relative to the first region. In a first specific example of this embodiment (e.g., as shown in FIG. 25), in which the regions are selected from a camera sensor, the second region is selected to the left of the first region as viewed facing toward the camera (e.g., viewpoint within the camera field of view) in response to a user input to move the field of view left. In a second specific example of this embodiment, the second camera sensor region is selected to the right of the first camera sensor region as viewed facing toward the camera in response to a user input to move the field of view right. In a third specific example of this embodiment, in which the regions are selected from a video, image, or image frame, the second region is selected to be to the left of the first region in response to a user input to move the field of view left. In a fourth specific example of this embodiment, in which the regions are selected from a video, image, or image frame, the second region is selected to be to the right of the first region in response to a user input to move the field of view right.

In a second embodiment of this variation, in response to a user input to move the field of view vertically (e.g., rotate up, translate up, rotate down, translate down), the second region is displaced vertically relative to the first region. In a first specific example of this embodiment, in which the regions are selected from a video, image, or image frame, the second region is selected to be above the first region in response to a user input to move the field of view up. In a second specific example of this embodiment, in which the regions are selected from a video, image, or image frame, the second region is selected to be below the first region in response to a user input to move the field of view down. In a third specific example of this embodiment, in which the regions are selected from a camera sensor and the image formed on the camera sensor is flipped (e.g., due to the camera optics) relative to the objects forming the image, the second region is selected to be below the first region in response to a user input to move the field of view up. In a fourth specific example of this embodiment, in which the regions are selected from a camera sensor and the image formed on the camera sensor is flipped (e.g., due to the camera optics) relative to the objects forming the image, the second region is selected to be above the first region in response to a user input to move the field of view down.

In a second variation of S150, the second region is selected based on an aerial system position change. This can function to stabilize the video stream. The position change can be an intentional change (e.g., aerial system roll or pitch to enable lateral translation), unintentional change (e.g., movement due to wind or aerial system collision), or any other suitable position change. However, the second region can additionally or alternatively be selected in any other suitable way, based on any other suitable criteria, at any other suitable time.

The second region is preferably selected by the aerial system. In one example, receiving the first video and second videos and selecting the first and second regions is performed by a processor on-board the aerial system. Additionally or alternatively, the second region can be selected at a remote computing system such as the user device, or at any other suitable system.

Displaying an image from the second region S160 can function to stream the compensated images. The images can be displayed as described in S120, or in any other suitable manner. For example, different pixel location subsets of the image frame can be selected as the first and second regions (e.g., wherein the corresponding pixels of the first and second regions are displayed at the touch-sensitive display during S120 and S160, respectively).

The image from the second region is preferably displayed concurrent with S140. The image can be displayed at the start of aerial system motion, during aerial system motion, at the end of aerial system motion, and/or during the entirety of aerial system motion. In one example, the second region of the second video is displayed concurrent with changing the aerial system position based on the drag input. Additionally or alternatively, the image can be displayed before S140, after S140, and/or at any other suitable time. In one example, the image from the second region and the image from the first region are sub-images of the same image. However, the image from the second region can be otherwise displayed.

The method can optionally include compensating for aerial system rotation using a gimbal system (e.g., active or passive), attached to the optical system, that automatically stabilizes the image (e.g., relative to a gravity vector). In one example, the gimbal system can be multi-axis (e.g., 3-axis), wherein each gimbal (e.g., roll, pitch, and yaw) includes a resolver. The resolvers receive a gyro output (e.g., indicative of gyro deviation from null), perform an automatic matrix transformation according to each gimbal angle, and deliver the required torque to the respective drive motor connected to each gimbal. However, the aerial system rotation can be otherwise compensated for.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for controlling an aerial system, the method comprising:
receiving a first video from a camera of the aerial system;
selecting a first region of the first video;
controlling a touch-sensitive display of a user device to display the first region of the first video, wherein the first region of the first video is displayed throughout a first time interval;
during the first time interval, receiving a drag input comprising a translation vector from the touch-sensitive display;
receiving a second video from the camera;
selecting a second region of the second video, wherein the second region is translated along the translation vector relative to the first region;
controlling the touch-sensitive display to display the second region of the second video; and
changing a position of the aerial system based on the drag input, wherein the second region of the second video is displayed concurrent with changing the aerial system position based on the drag input.

2. The method of claim 1,
wherein the translation vector defines a horizontal component parallel to a horizontal edge of the touch-sensitive display; and
wherein changing a position of the aerial system based on the drag input comprises rotating the aerial system about a yaw axis based on the horizontal component.

3. The method of claim 2,
wherein the horizontal component points left; and
wherein the aerial system rotates about the yaw axis clockwise as viewed from above, relative to a gravity vector.

4. The method of claim 2, wherein the aerial system comprises a gimbal rotatably mounting the camera, the camera rotatable about a gimbal axis substantially perpendicular the yaw axis, the method further comprising:
receiving a second drag input comprising a second translation vector from the touch-sensitive display, the second translation vector defining a vertical component perpendicular the horizontal edge; and
based on the vertical component, rotating the camera about the gimbal axis.

5. The method of claim 4, wherein the second drag input is the drag input and the second translation vector is the translation vector.

6. The method of claim 2, wherein the touch-sensitive display received the drag input at a first display region, and wherein rotating the aerial system about the yaw axis comprises rotating the aerial system in a first direction, the method further comprising:
after rotating the aerial system in the first direction, receiving a second drag input from the touch-sensitive display, wherein the second drag input comprises a second translation vector codirectional with the translation vector, the second translation vector defining a second horizontal component codirectional with the horizontal component, wherein the touch-sensitive display received the second drag input at a second display region non-overlapping with the first display region; and
based on the second horizontal component, rotating the aerial system in the first direction.

7. The method of claim 2, wherein rotating the aerial system about a yaw axis based on the horizontal component comprises rotating the aerial system based on a value of a rotation parameter, wherein the value is a monotonically increasing function of a magnitude of the horizontal component.

8. The method of claim 7, wherein the rotation parameter is an aerial system rotation speed.

9. The method of claim 2, further comprising, while rotating the aerial system about the yaw axis:
receiving a third video from the camera;
selecting a third region of the third video, wherein the third region is between the first region and the second region;
controlling the touch-sensitive display to display the third region of the third video;
after displaying the third region of the third video, receiving a fourth video from the camera;
selecting a fourth region of the fourth video, wherein the fourth region of the fourth video is in the same position as the first region of the first video; and
controlling the touch-sensitive display to display the first region of the fourth video.

10. The method of claim 1,
wherein the translation vector defines a horizontal component parallel to a horizontal edge of the touch-sensitive display;
wherein the second region is rotated in a first direction relative to the first region; and
wherein changing a position of the aerial system based on the drag input comprises translating the aerial system in a direction substantially parallel to a broad face of a sensor of the camera, based on the horizontal component.

11. The method of claim 10, further comprising determining a roll angle between an edge of the broad face of the sensor and a projection of a gravity vector onto the broad face, wherein a rotation angle between the first and second regions is substantially equal to the roll angle.

12. The method of claim 10, further comprising, after translating the aerial system:
receiving a third video from the camera;
selecting a third region of the third video:
wherein a center of the third region is substantially coincident with a center of the first region; and
wherein the third region is rotated in a second direction relative to the first region, wherein the second direction is opposite the first direction; and
controlling the touch-sensitive display to display the third region of the third video.

13. The method of claim 1, wherein receiving the first video and second videos and selecting the first and second regions is performed by a processor on-board the aerial system.

14. A method for controlling an aerial system, the method comprising:
selecting a first region of a camera sensor of the aerial system, the camera sensor comprising a first sensor edge and a second sensor edge opposing the first sensor edge;
receiving a first image sampled by the first region, the first image comprising a first image region sampled proximal the first sensor edge and a second image region sampled proximal the second sensor edge;
controlling a touch-sensitive display of a user device to display the first image within an entirety of a display area of the touch-sensitive display, the display area comprising a first display edge and a second display edge opposing the first display edge, the first image region displayed proximal the first display edge and the second image region displayed proximal the second display edge;
concurrent with the display of the first image, receiving a drag input from the touch-sensitive display, the drag input received within the display area, the drag input comprising a drag vector extending toward the second display edge;
selecting a second region of the camera sensor based on the drag input, wherein a center of the first region is more proximal the second sensor edge than a center of the second region;
receiving a second image sampled by the second region;
controlling the touch-sensitive display to display the second image within the entirety of the display area; and
changing a position of the aerial system based on the drag input.

15. The method of claim 14, wherein:
the first and second regions cooperatively define a translation vector from the center of the first region to the center of the second region; and
changing a position of the aerial system based on the drag input comprises moving the camera in a direction substantially opposing the translation vector.

16. The method of claim 14,
wherein the first and second regions cooperatively define a translation vector from the center of the first region to the center of the second region, wherein the translation vector defines a horizontal component perpendicular to the first sensor edge; and
wherein changing a position of the aerial system based on the drag input comprises translating the aerial system in a flight direction, wherein an angle between the flight direction and the horizontal component is obtuse.

17. The method of claim 16, wherein the flight direction is substantially perpendicular a gravity vector and substantially parallel a broad face of the camera sensor.

18. The method of claim 16, wherein:
- the second region is rotated about a roll axis in a first direction relative to the first region, the roll axis normal to the broad face of the camera sensor; and
- translating the aerial system comprises rotating the aerial system about the roll axis in a second direction opposite the first direction.

19. The method of claim 16, the method further comprising:
- receiving a second drag input from the touch-sensitive display, the second drag input received within the display area, the second drag input comprising a second drag vector extending toward the second display edge;
- selecting a third region of the camera sensor, wherein a center of the first region is more proximal the second sensor edge than a center of the third region;
- receiving a third image sampled by the third region;
- controlling the touch-sensitive display to display the third image; and
- rotating the aerial system about a yaw axis based on the second drag vector.

* * * * *